United States Patent
Mosier et al.

(10) Patent No.: US 11,573,388 B2
(45) Date of Patent: Feb. 7, 2023

(54) SYSTEM FOR LOCKING OPTICAL FIBERS WITHIN A FIBER OPTIC CABLE

(71) Applicant: COMMSCOPE TECHNOLOGIES LLC, Hickory, NC (US)

(72) Inventors: Gregory Robert Mosier, Burnsville, MN (US); Scott L. Carlson, Bloomington, MN (US); Yu Lu, Eden Prairie, MN (US); Ryan Kostecka, Waconia, MN (US); Samuel Taylor Finnegan, Eden Prairie, MN (US); Joseph Michael Marrazzo, Chanhassen, MN (US)

(73) Assignee: CommScope Technologies LLC, Hickory, NC (US)

( * ) Notice: Subject to any disclaimer, the term of this patent is extended or adjusted under 35 U.S.C. 154(b) by 9 days.

(21) Appl. No.: 17/328,536

(22) Filed: May 24, 2021

(65) Prior Publication Data
US 2021/0341700 A1    Nov. 4, 2021

Related U.S. Application Data

(63) Continuation of application No. 16/492,053, filed as application No. PCT/US2018/021310 on Mar. 17, 2018, now Pat. No. 11,016,258.
(Continued)

(51) Int. Cl.
*G02B 6/44* (2006.01)
*G02B 6/38* (2006.01)

(52) U.S. Cl.
CPC ......... *G02B 6/4433* (2013.01); *G02B 6/4403* (2013.01); *G02B 6/443* (2013.01);
(Continued)

(58) Field of Classification Search
None
See application file for complete search history.

(56) References Cited

U.S. PATENT DOCUMENTS 5,042,902 A * 8/1991 Huebscher ........... G02B 6/2558
                                                385/95
6,744,954 B1    6/2004 Tanaka et al.
(Continued)

FOREIGN PATENT DOCUMENTS

CN    106168696 A    11/2016
JP    H07-92334 A    4/1995
(Continued)

OTHER PUBLICATIONS

International Search Report and Written Opinion of the International Searching Authority for International Patent Application No. PCT/US2018/021310 dated Jun. 20, 2018, 13 pages.
(Continued)

*Primary Examiner* — Michelle R Connelly
(74) *Attorney, Agent, or Firm* — Merchant & Gould P.C.

(57) ABSTRACT

The present disclosure incudes a fiber optic cable having a conduit including a conduit wall defining a conduit passage that extends longitudinally through the conduit. The conduit also includes an adhesive injection port defined through the conduit wall and at least one optical fiber within the conduit passage. The cable further includes a fiber lock including an adhesive volume in communication with the adhesive injection port. The adhesive volume includes a main adhesive volume positioned within the conduit passage and bonded to the optical fiber. The main adhesive volume is fixed to prevent longitudinal movement relative to the conduit.

20 Claims, 40 Drawing Sheets

Related U.S. Application Data

(60) Provisional application No. 62/468,095, filed on Mar. 7, 2017.

(52) U.S. Cl.
CPC ......... *G02B 6/4429* (2013.01); *G02B 6/4471* (2013.01); *G02B 6/3889* (2013.01)

(56) References Cited

U.S. PATENT DOCUMENTS

| | | | |
|---|---|---|---|
| 2011/0008007 A1 | 1/2011 | Osato et al. | |
| 2018/0024294 A1* | 1/2018 | Wang ................... | G02B 6/2558 385/78 |

FOREIGN PATENT DOCUMENTS

| | | |
|---|---|---|
| JP | 2000-180660 A | 6/2000 |
| JP | 5948650 B2 | 7/2016 |
| WO | 2013/016135 A2 | 1/2013 |

OTHER PUBLICATIONS

Extended European Search Report for corresponding European Patent Application No. 18764125.3 dated Dec. 11, 2020, 6 pages.
https://www.merriam-webster.com/dictionary/volume, accessed Nov. 2, 2020. (Year: 2020).

* cited by examiner

SYSTEM FOR LOCKING OPTICAL FIBERS WITHIN A FIBER OPTIC CABLE

CROSS-REFERENCE TO RELATED APPLICATION

This application is a Continuation of U.S. patent application Ser. No. 16/492,053, filed on Sep. 7, 2019, now U.S. Pat. No. 11,016,258, which is a National Stage Application of PCT/US2018/021310, filed on Mar. 7, 2018, which claims the benefit of U.S. Patent Application Ser. No. 62/468,095, filed on Mar. 7, 2017, the disclosures of which are incorporated herein by reference in their entireties. To the extent appropriate, a claim of priority is made to each of the above disclosed applications.

TECHNICAL FIELD

The present disclosure relates generally to fiber optic cables. More particularly, the present disclosure relates to systems and methods for locking optical fibers within fiber optic cables.

BACKGROUND

Fiber optic cables typically include a jacket containing one or more optical fibers. Cable jackets can have a variety of shapes such as round cable jackets and flat cable jackets. Fiber optic cables also typically include reinforcing elements such as Aramid yarns or glass reinforced polymer rods that are positioned within or embedded within the cable jackets. The optical fibers within the fiber optic cables can include single optical fibers, loose optical fibers, and ribbonized optical fibers. In one configuration, one or more unbuffered optical fibers are positioned within a buffer tube within the fiber optic cable. The buffer tube can include a water blocking gel that fills voids within the buffer tube. In other examples, a separate buffer tube can be eliminated and the optical fibers can be positioned within a passage defined by the jacket itself.

Under certain circumstances, tension can be applied to optical fibers within a fiber optic cable. This can be problematic when the tension causes the fibers to pull-back on ferrules of fiber optic connectors mounted at the ends of the optical fibers. When this occurs, the fiber optic connectors can be disconnected from mating fiber optic connectors. Tension can be applied to optical fibers by a variety of circumstances such as uncoiling the cable, or jacket expansion caused by temperature variations and/or axial loads applied to cable jackets. There is a need to efficiently and effectively anchor optical fibers within a fiber optic cable to, among other things, prevent pull-back loads from being applied by the optical fibers to ferrules corresponding to fiber optic connectors mounted at the ends of the optical fibers.

SUMMARY

Aspects of the present disclosure relate to a fiber optic cable having a conduit including a conduit wall defining a conduit passage that extends longitudinally through the conduit. The conduit also includes an adhesive injection port defined through the conduit wall. The adhesive injection port extends through the conduit wall from an outer side of the conduit to the conduit passage. The fiber optic cable also includes at least one optical fiber within the conduit passage, and a fiber lock including an adhesive volume in communication with the adhesive injection port. The adhesive volume includes a main adhesive volume positioned within the conduit passage and bonded to the optical fiber. The main adhesive volume is longitudinally fixed relative to the conduit.

In certain examples, the adhesive volume also includes a plug portion positioned within the adhesive injection port. The plug portion is contiguous with the main adhesive volume and forms a mechanical interlock with respect to the conduit wall. The mechanical interlock resists longitudinal movement of the optical fiber and the main adhesive volume relative to the conduit wall.

In certain examples, the adhesive injection port defines a maximum cross dimension that is less than or equal to 50% of a maximum cross-dimension defined by the transverse cross-sectional shape of the cable. In certain examples, the adhesive injection port defines an enclosed port shape having a maximum cross-dimension that is less than or equal to 40%, 30% or 25% of a maximum cross-dimension of the outer transverse cross-sectional shape of the jacket of the fiber optic cable.

In certain examples, the adhesive injection port is formed by a punching or drilling process.

In certain examples, the adhesive injection port is used in combination with vent ports to control the flow of adhesive within the fiber optic cable and to therefore locate the main adhesive volume within the conduit passage.

In certain examples, gel within the optic cable can be displaced from the adhesive injection port and surrounding region by introducing (e.g., blowing) a gas such as air into the conduit passage through the adhesive injection port.

In certain examples, the conduit can include a cable jacket or a buffer tube.

In certain examples, the use of an adhesive injection port for accessing the conduit passage is less compromising with respect to the structure of the fiber optic cable when compared to techniques such as window cutting, ring cutting, stripping and/or skiving.

In certain examples, the fiber lock further includes an anchor member that projects through the conduit wall and into the main adhesive volume. It will be appreciated that the anchor member can extend through the adhesive injection port, through one of the vent ports, or through a separate port defined through the conduit wall. In certain examples, the anchor member can include a pin, screw or other projection. In certain examples, the anchor member can be coupled to an outer shell positioned over the cable. In certain examples, the anchor member can be unitarily formed with the shell.

In certain examples, the fiber lock can include a deformation in the conduit wall that projects into the conduit passage and interlocks with or opposes a portion of the main adhesive volume to resist longitudinal movement of the main adhesive volume relative to the conduit wall. In certain examples, a plurality of deformations are defined by the conduit wall that each project into the main adhesive volume or oppose a portion of the main adhesive volume in a manner that resists axial/longitudinal movement of the main adhesive volume relative to the conduit wall. In certain examples, the deformations can be longitudinally offset from one another. In certain examples, the deformations can be longitudinally aligned with one another and can oppose one another. In certain examples, the deformations are caused by one or more projections from an outer shell that cause the conduit wall to be pressed inwardly into the conduit passage. In certain examples, the projections can cause deformations in a cable jacket and/or deformations in a buffer tube.

In certain examples, the deformed portion of the conduit wall laterally/radially overlaps a portion of the main adhesive volume such that interference or opposition between the deformation and the portion of the main adhesive body resists longitudinal movement of the main adhesive body relative to the conduit wall.

In certain examples the deformed portion of the conduit wall forms an obstruction within the conduit passage that inhibits longitudinal movement of the adhesive volume adhered to the one or more optical fibers.

DETAILED DESCRIPTION

Figure 1:
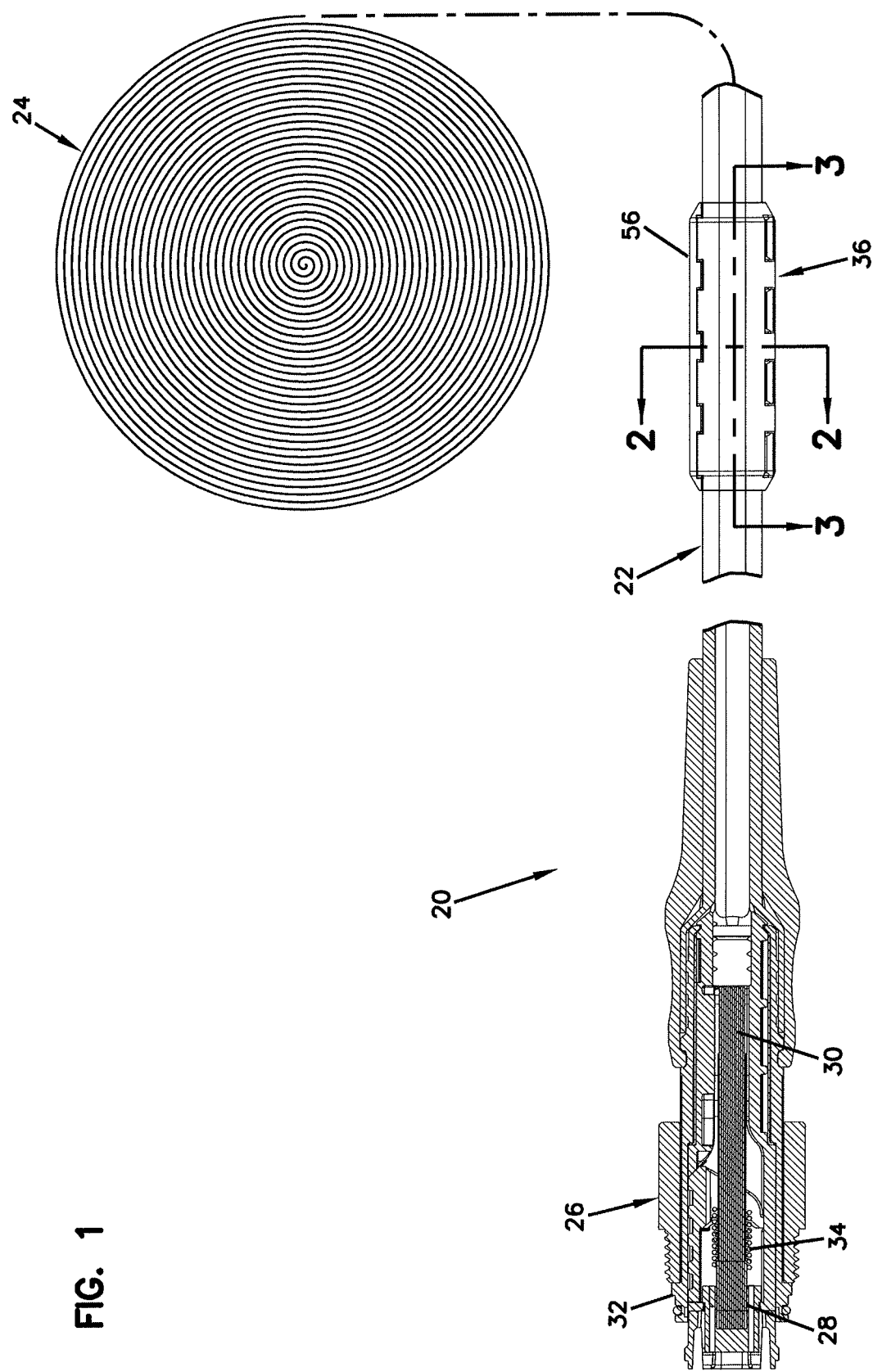
FIG. 1 illustrates a connectorized fiber optic cable having a fiber lock in accordance with the principles of the present disclosure.

FIG. 1 illustrates a connectorized fiber optic cable assembly 20 in accordance with the principles of the present disclosure. The connectorized fiber optic cables assembly 20 includes a fiber optic cable 22. A portion of the fiber optic cable 22 is shown schematically arranged in a coil 24 which is representative of the fiber optic cable 22 being wrapped around a spool. The fiber optic cable 22 is depicted as a flat cable having an elongate cross-sectional shape (see FIG. 2). In other embodiments, the fiber optic cable could have other transverse cross-sectional shapes such as a round shape, a butterfly shape, or other shapes. It will be appreciated that aspects of the present disclosure relate to single-fiber fiber optic cables and multi-fiber fiber optic cables. In the case of multi-fiber fiber optic cables, the optical fibers can be arranged in a loose-tube configuration or can be ribbonized.

Referring still to FIG. 1, the connectorized fiber optic cable assembly 20 includes a fiber optic connector 26 mounted at one end of the fiber optic cable 22. The fiber optic connector 26 includes a ferrule 28 supporting the ends of a plurality of optical fibers 30 of the fiber optic cable 22. The ferrule 28 is moveable in a forward axial direction relative to a main body 32 of the fiber optic connector. A spring 34 biases the ferrule 28 outwardly in an axial direction from the main body 32.

It will be appreciated that the fiber optic cable 22 can be exposed to certain conditions that cause the optical fibers 30 to move within the fiber optic cable 22. For example, unspooling of the coil 24 can at times cause the optical fibers 30 to be pulled back within the fiber optic cable 22 relative to the fiber optic connector 26. When this occurs, the optical fibers 30 can pull the ferrule 28 rearwardly relative to the main body 32 of the fiber optic connector 26 against the bias of the spring 34. The pulling back of the ferrule 28 can cause the fiber optic connector 26 to disconnect from a corresponding mated fiber optic connector. Therefore, it is desirable to provide a configuration that locks the optical fibers 30 within the fiber optic cable 22 so that the optical fibers 30 are prevented from moving within the fiber optic cable and pulling back on the ferrule 28.

Figure 2:
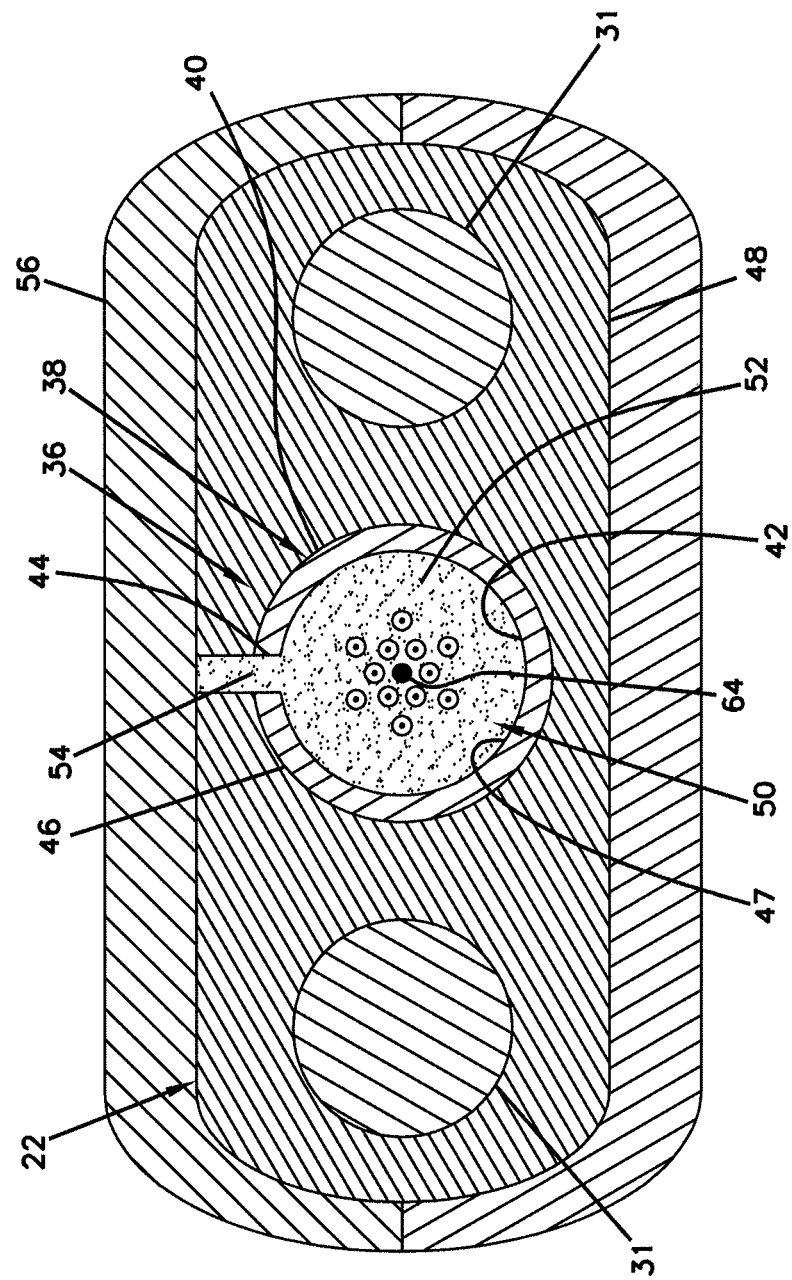
FIG. 2 is a cross-sectional view taken along section line 2-2 of FIG. 1.
Figure 3:
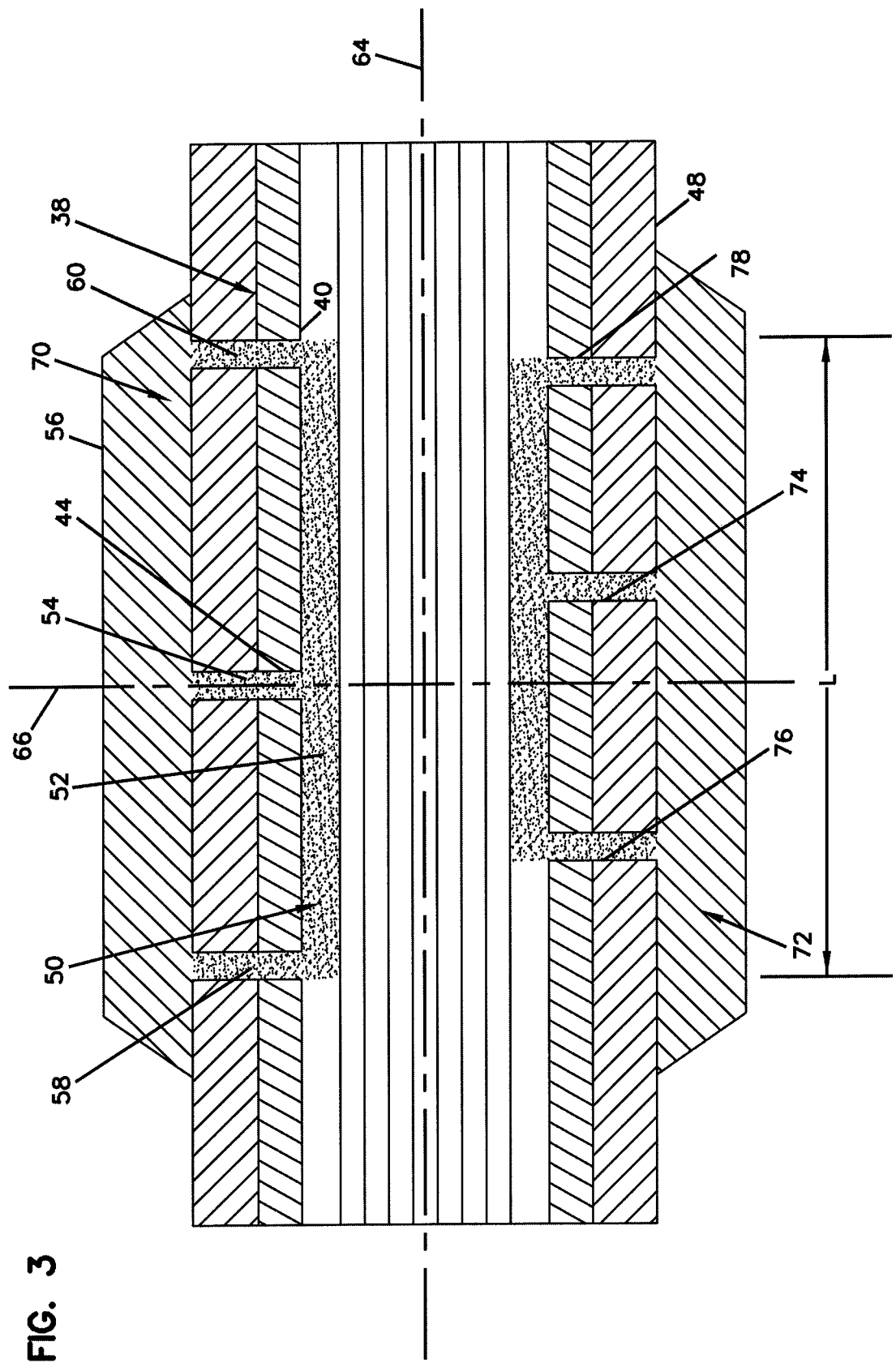
FIG. 3 is a cross-sectional view taken along section line 3-3 of FIG. 1.

Referring to FIGS. 1-3, the connectorized fiber optic cable assembly 20 includes a fiber lock 36 for locking the optical fibers 30 at a certain location relative to the fiber optic cable 22. As shown at FIG. 2, the fiber optic cable 22 includes a conduit 38 including a conduit wall 40 defining a conduit passage 42 that extends longitudinally through the conduit 38. The conduit 38 also includes an adhesive injection port 44 defined through the conduit wall 40. The adhesive injection port 44 extends through the conduit wall 40 from an outer side 46 of the conduit 38 to an inner side of the conduit which defines the conduit passage 42. As depicted at FIG. 2, the conduit 38 is a buffer tube positioned within a jacket 48 of the fiber optic cable 22. In other examples, the buffer tube can be eliminated and the conduit can be defined by the jacket 48. As depicted at FIG. 2, the optical fibers 30 are non-ribbonized and are loosely arranged within the conduit 38 at regions of the conduit other than the fiber lock. As depicted, the optical fibers 30 within the conduit 38 are coated optical fibers that typically have a diameter less than 260 microns. Each of the coated optical fibers can include a core surrounded by a cladding layer and a coating layer. Example coating layers can include a polymeric material such as acrylate. The cable can include reinforcing members 31 (see FIG. 2) such as fiberglass reinforced polymer rods or metal rods. In other examples, flexible tensile reinforcing members such as aramid yarn or other string-like reinforcements can be used.

Referring still to FIG. 2, the optical fibers 30 (or at least one optical fiber) are positioned within the conduit passage 42 of the conduit 38. The fiber lock 36 of the fiber optic cable 22 includes an adhesive volume 52 in communication with the adhesive injection port 44. The adhesive volume 52 includes a main adhesive volume 52 positioned within the conduit passage 42 and bonded to the optical fibers 30. The main adhesive volume 52 is fixed relative to the conduit 38 to prevent longitudinal movement between the conduit 38 and the main adhesive volume 52.

The fiber lock 36 also includes an anchor for preventing longitudinal movement between the main adhesive volume 52 and the conduit 38 and/or the jacket 48. As depicted at FIG. 2, the anchor includes an adhesive plug portion 54 which is part of the adhesive volume 52 and which projects outwardly from the main adhesive volume 52. The adhesive plug portion 54 is positioned within the adhesive injection port 44. The adhesive plug portion 54 is contiguous with the main adhesive volume 52. The adhesive plug portion 54 forms a mechanical interlock with respect to the conduit wall 40 which resists longitudinal movement of the optical fibers 30 and the main adhesive volume 52 relative to the conduit wall 40. Since the main adhesive volume 52 is bonded to the optical fibers 30 and is also fixed against longitudinal movement relative to the conduit 30, the fibers are also fixed against longitudinal movement relative to the conduit 38.

Figure 6:
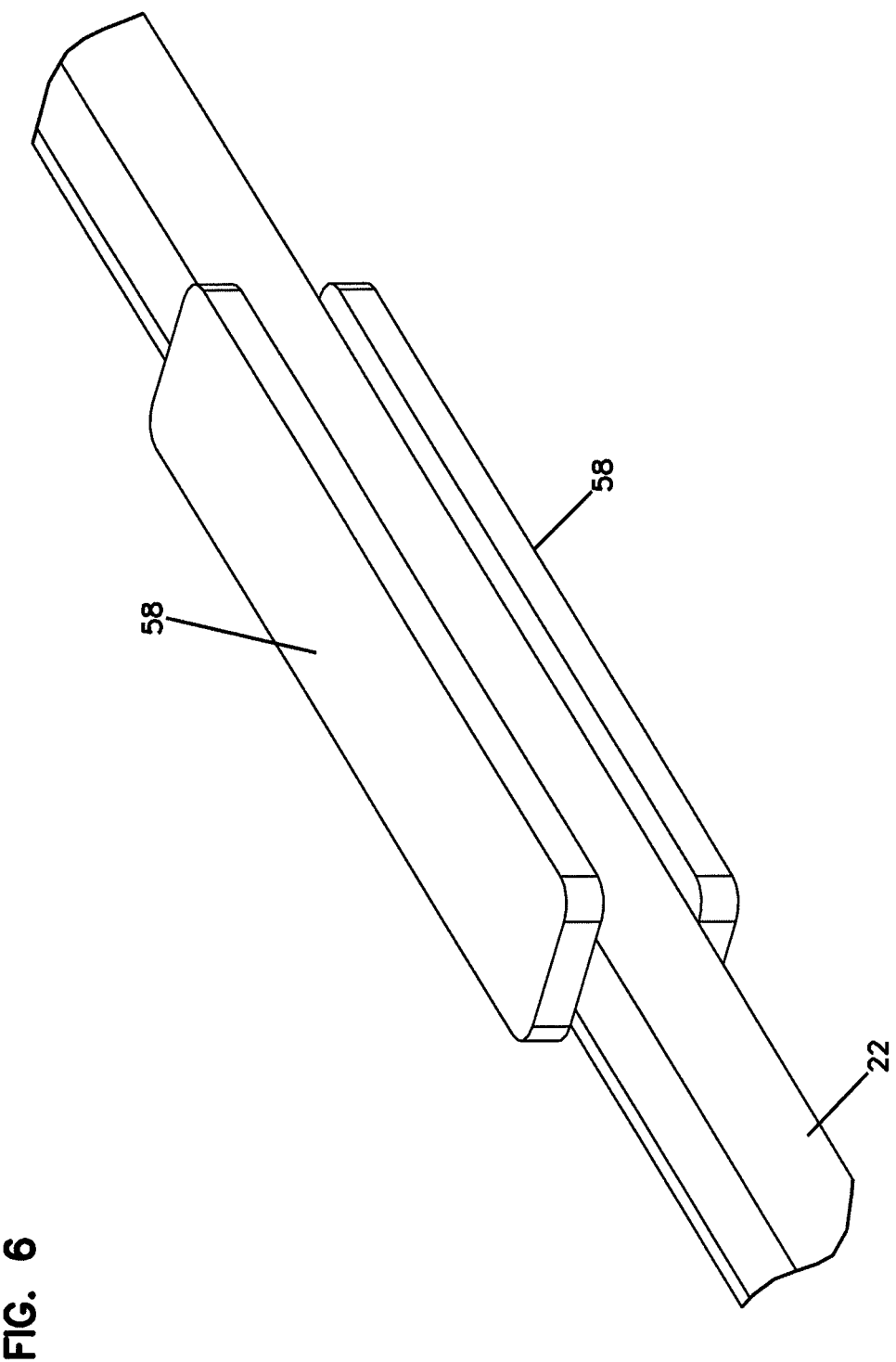
FIG. 6 illustrates an example reinforcing configuration for providing exterior reinforcing and enhanced rigidity along a region of a fiber optic cable having a fiber lock in accordance with the principles of the present disclosure.

It will be appreciated that once the optical fibers are encased within and bonded to the adhesive volume 50, it is undesirable to bend the adhesive volume 52 since such bending could cause breakage or other damage to the optical fibers 30. To prevent the main adhesive volume 52 from being bent, an exterior reinforcing structure can be provided on the fiber optic cable 22 along the length of the adhesive volume 50. In certain examples, reinforcement and enhanced rigidity can be provided by an exterior shell arrangement 56 that mounts about the outside of the cable jacket 48. In other examples, reinforcing plates 58 (see FIG. 6) can be mounted at the fiber lock to prevent bending of the optical fibers contained within the adhesive volume 52. The reinforcing plates 56 can be secured to the fiber optic cable by a heat-shrink sleeve, a heat-shrink wrap, an over-mold, a tape-wrap, or other structures.

Referring to FIG. 3, the fiber lock 36 also includes a first vent port 58 defined through the conduit wall 40 at a first location upstream from the adhesive injection port 44 and a second vent port 60 defined through the conduit wall 40 at a location downstream from the adhesive injection port 44. In one example, the adhesive injection port 44, the first vent port 58, and the second vent port 60 are aligned along a reference line 62 (see FIG. 7) that is parallel to a central longitudinal axis 64 (see FIGS. 2 and 3) of the fiber optic cable 22. In other examples, the ports can be circumferentially offset from one another about the central longitudinal axis 64. In certain examples, the adhesive injection port 44 defines a port axis 66 that is perpendicular relative to the central longitudinal axis 64 of the conduit passage 42. In other examples, the adhesive injection port 44 can extend laterally through the conduit wall 40 with the port axis 66 arranged at a non-perpendicular angle relative to the central longitudinal axis 64, or with the port axis 66 not intersecting the central longitudinal axis 64. In certain examples, a longitudinal length L of the main adhesive volume 52 is defined by and between the first and second vent ports 58, 60. For example, an upstream end of the main adhesive volume 52 can correspond to the first vent port 58 and a downstream end of the main adhesive volume 52 can correspond to the second vent port 60.

In certain examples, the adhesive injection port 44, the first vent port 58 and the second vent port 60 form a first set of ports 70 positioned at a first side of the conduit 38. As shown at FIG. 3, the conduit 38 also defines a second set of ports 72 positioned at a second side of the conduit 38 that is opposite from the first side of the conduit 38. The second set of ports 72 includes an adhesive injection port 74, a first vent port 76 positioned upstream from the adhesive injection port 74 and a second vent port 78 positioned downstream from the adhesive injection port 74. In certain examples, the adhesive injection port 74 of the second set of ports 72 is longitudinally offset from the adhesive injection port 44 of the first set of ports 70. Also, the first vent port 76 of the second set of ports 72 is longitudinally offset from the first vent port 58 of the first set of ports 70. Additionally, the second vent port 78 of the second set of ports 72 is longitudinally offset from the second vent port 60 of the first set of ports 70. In certain examples, the vent ports function as vents when adhesive is injected into the conduit passage 42 through either of the adhesive injection ports. During injection of the adhesive into the conduit passage 42, the adhesive flows in upstream and downstream directions from the adhesive injection port 44 and/or the adhesive injection port 74. Adhesive flow continues in the upstream and downstream direction until the adhesive reaches the upstream and downstream vent ports. At this time, the adhesive begins to flow out of the conduit passage 42 through the vent ports. Thus, the upstream and downstream vents ports effectively control the longitudinal length L of the main adhesive volume 52 within the conduit passage 42.

In certain examples, the ports can be defined using a punching process. In other examples, techniques such as drilling or using a laser or other energy source to define the ports can be used. It is preferred for each of the ports to be relatively small when compared to the overall cross-dimension of the fiber optic cable. In this way, the ports can be more easily covered and do not provide meaningfully compromise the structural integrity of the cable jacket or the conduit.

In certain examples each adhesive injection port has a transverse cross-sectional area that is smaller than a transverse cross-sectional area of the conduit passage. In certain examples each adhesive injection port has a transverse cross-sectional area that is less than one half of a transverse cross-sectional area of the conduit passage. In certain examples each transverse adhesive injection port has a transverse cross-sectional area that is less than a third of a cross-sectional area of the conduit passage. In certain examples each adhesive injection port has a transverse cross-sectional area that is less than a fourth of a transverse cross-sectional area of the conduit passage. In certain examples each adhesive injection port has a transverse cross-sectional area that is less than a fifth of a transverse cross-sectional area of the conduit passage. In certain examples each adhesive injection port has a maximum transverse cross-dimension that is less than or equal to 40%, or 30%, or 25%, or 20% of a maximum outer transverse cross-dimension of the cable jacket. In certain examples, each adhesive injection port has a maximum cross-dimension that is less than a maximum cross-dimension of the conduit passage. In certain examples, the maximum cross-dimension of the conduit passage is at least 1.1 or 1.2 or 1.3 or 1.4 times as large as the maximum cross-dimension of the adhesive injection port.

In certain examples, the adhesive injection port is defined by a punching or drilling process. In certain examples, the injection port has a port shape. In certain examples, the port shape is circular or polygonal. In certain examples, the adhesive injection port defines a central port axis that is transversely oriented relative to a longitudinal dimension of the conduit passage and the port shape defines a port boundary that extends fully around the port axis and that is centered about the port axis. In certain examples the central port axis is perpendicular relative to a central longitudinal axis of the conduit passage.

To form the fiber lock, the first set of ports 70 is initially formed through one side of the fiber optic cable 22 and then the second set of ports 72 is defined through the opposite side of the cable 22. In the case where the fiber optic cable includes both a jacket and buffer tube, the ports are defined through the jacket and the buffer tube. In cases where no buffer tube is provided inside the jacket, the ports are defined only through the cable jacket. Once the first and second sets of ports 70, 72 have been defined, an adhesive (e.g., a thermo-set epoxy or other type of adhesive) is injected into the conduit passage 42 through the adhesive injection port 44. As the adhesive is injected into the conduit passage though the adhesive injection port 44, the adhesive flows between and around the optical fibers 30 thereby encapsulating the fibers in adhesive. The adhesive flows in an upstream and downstream direction from the adhesive injection port 44. The injection of adhesive through the adhesive injection port 44 is continued until adhesive begins to bleed from at least the first and second vent ports 58, 60. When bleeding occurs through the first and second vent ports 58, 60, it is known that the main adhesive volume 52 extends the longitudinal length L. After adhesive injection has been completed at the injection port 44, adhesive is injected through the adhesive injection port 74. As adhesive is injected into the conduit passage 42 through the adhesive injection port 74, the adhesive encapsulates the optical fibers 32 and flows in an upstream and downstream direction from the adhesive injection port 74. The injection of adhesive is continued until adhesive begins to bleed from the first and second vent ports 76, 78. The bleeding action provided by the vent ports 58, 60, 76 and 78 controls the distance the adhesive flows within the conduit passage 42 in the upstream and downstream directions. After the adhesive has been injected into the conduit passage 42, the adhesive can be cured over time or through a temperature-based curing process (e.g., heating over a certain time) or other curing process (e.g., UV curing, room temperature curing, etc.). It will be appreciated that portions of the adhesive form the main adhesive volume 52 and portions of the adhesive can form adhesive plug portions 54 positioned in the adhesive injection ports 44, 74 and in the vent ports 58, 60, 76, 78. Before or after the adhesive has been cured, a reinforcing structure such as the shell 56 or reinforcing plates 57 can be mounted over the fiber optic cable 22 along the longitudinal length L corresponding to the extent of the main adhesive volume 52. In this way, the exterior reinforcement prevents the main adhesive volume 52 from being bent in a manner that may cause damage to the optical fibers adhered within the main adhesive volume 52. In certain examples, additional structure such as a heat-shrink wrap or sleeve can be mounted over the reinforcing structure for aesthetic purposes and/or for providing enhanced retention and sealing.

In other examples, the process steps and sequence can be modified. For example, in certain examples, adhesive can be injected simultaneously through both of the adhesive injection ports 44, 74 until adhesive bleeds from the vent ports 58, 60, 76, 78. In other examples, the first set of ports 70 can initially be formed and the adhesive can be injected through the adhesive injection port 44 before the second set of ports 72 have been formed. In this example, adhesive is injected into the adhesive injection port 44 until the adhesive bleeds from the vent ports 58, 60. Next, the second set of ports 72, is defined through the opposite side of the fiber optic cable 22. Then, adhesive is injected through the adhesive injection port 74 until the adhesive flows from the vent ports 76, 78. Thereafter, the adhesive is cured and the fiber lock 76 location is reinforced. In cases where the cable includes a conduit that includes gel (e.g., water blocking gel) within the conduit along with the optical fibers, a gas such as air can be blown into the adhesive injection port prior to injecting the adhesive. In this way, the gas can displace the gel from the volume within the conduit intended to be occupied by the adhesive. As the gas is blown into the conduit, the gel is displaced and exits the conduit though the vent ports.

Figure 4:
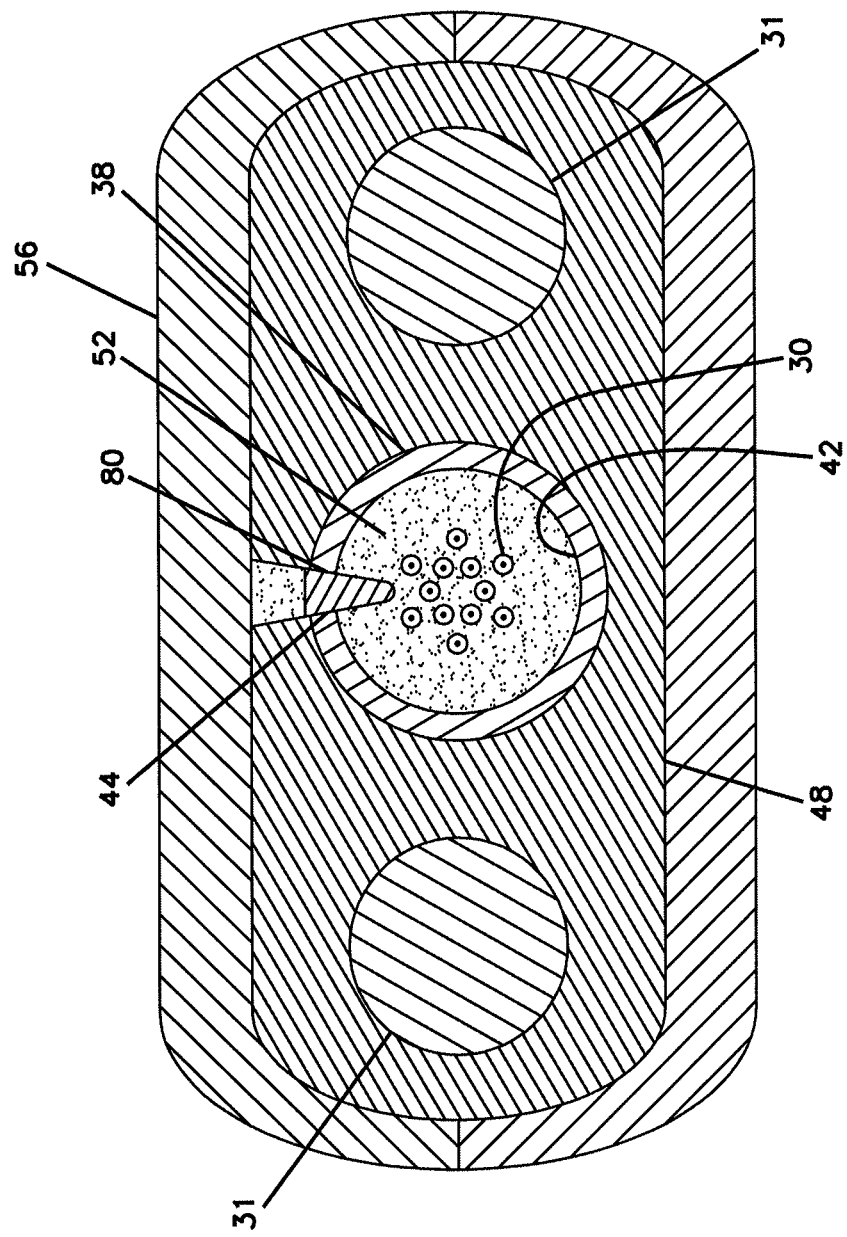
FIG. 4 is a cross-sectional view showing another fiber lock in accordance with the principles of the present disclosure.
Figure 5:
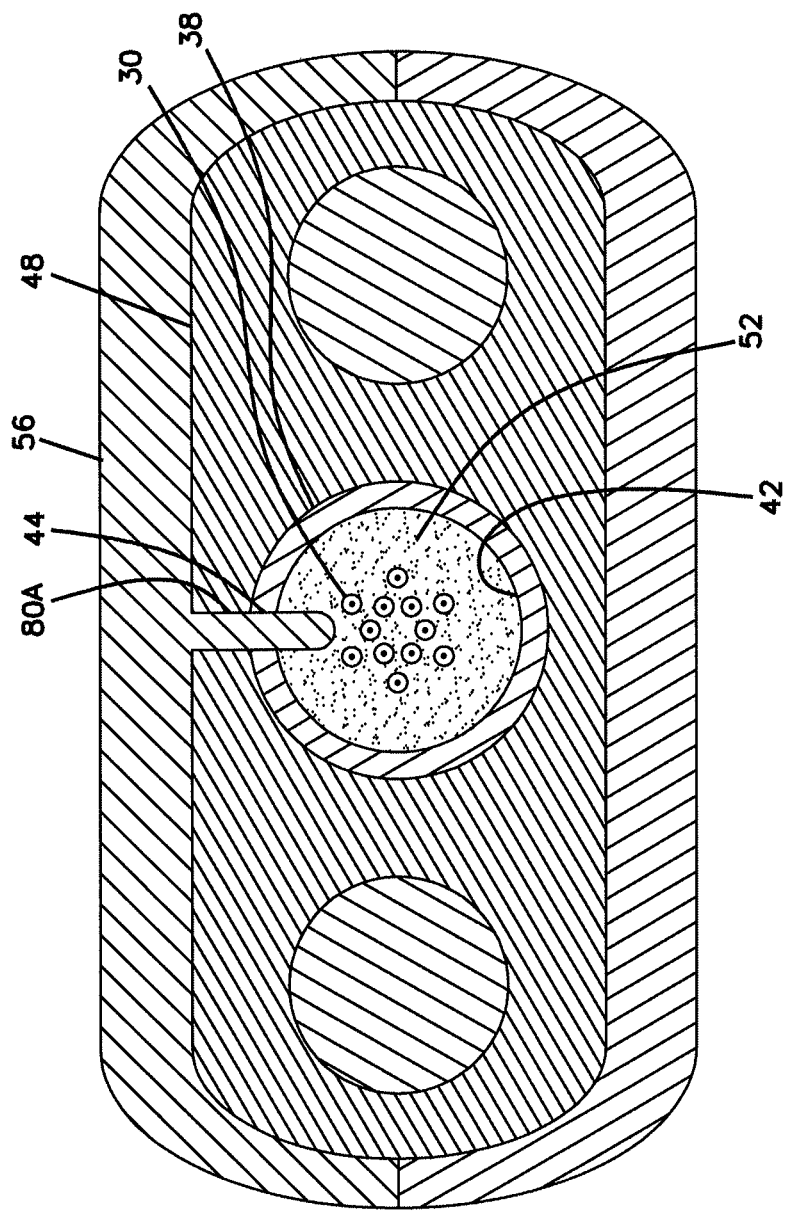
FIG. 5 is a cross-sectional view showing still another fiber lock in accordance with the principles of the present disclosure.

In certain examples, structure in addition to the adhesive can be used to enhance the fixation of the optical fiber or optical fibers 30 relative the conduit 38. For example, FIG. 4 illustrates an anchor 80 that embeds in the main adhesive volume 52 and extends at least partially through the conduit wall 40. In other examples, the anchor 80 extends through both the conduit wall 40 and the wall of the jacket 48. In certain examples, the anchor 80 is a projection that projects into the main adhesive volume 52 within the conduit passage 42. In certain examples, the anchor 80 is made of a material other than adhesive. In certain examples, the anchor 80 is metal or plastic. In certain examples, the anchor 80 is a projection. In certain examples, the anchor 80 includes a pin. In certain examples, the anchor 80 is a separate piece from the shell 56. In other examples, the anchor 80 is a projection that is integrated with the shell 56 that mounts about the exterior of the fiber optic cable 22 along the length of the main adhesive volume 52. For example, FIG. 5 shows an anchor 80A unitarily formed with the shell 56. In the embodiment of FIGS. 4 and 5, the anchors 80, 80A are shown extending through the adhesive injection port 44. In other examples, anchors can extend through the adhesive injection port 74, the first vent port 58, the second vent port 60, the first vent port 76 or the second vent port 78. Additionally, anchors in the form of projections can also project through other ports defined between the adhesive injection ports and the vent ports.

Figure 7:
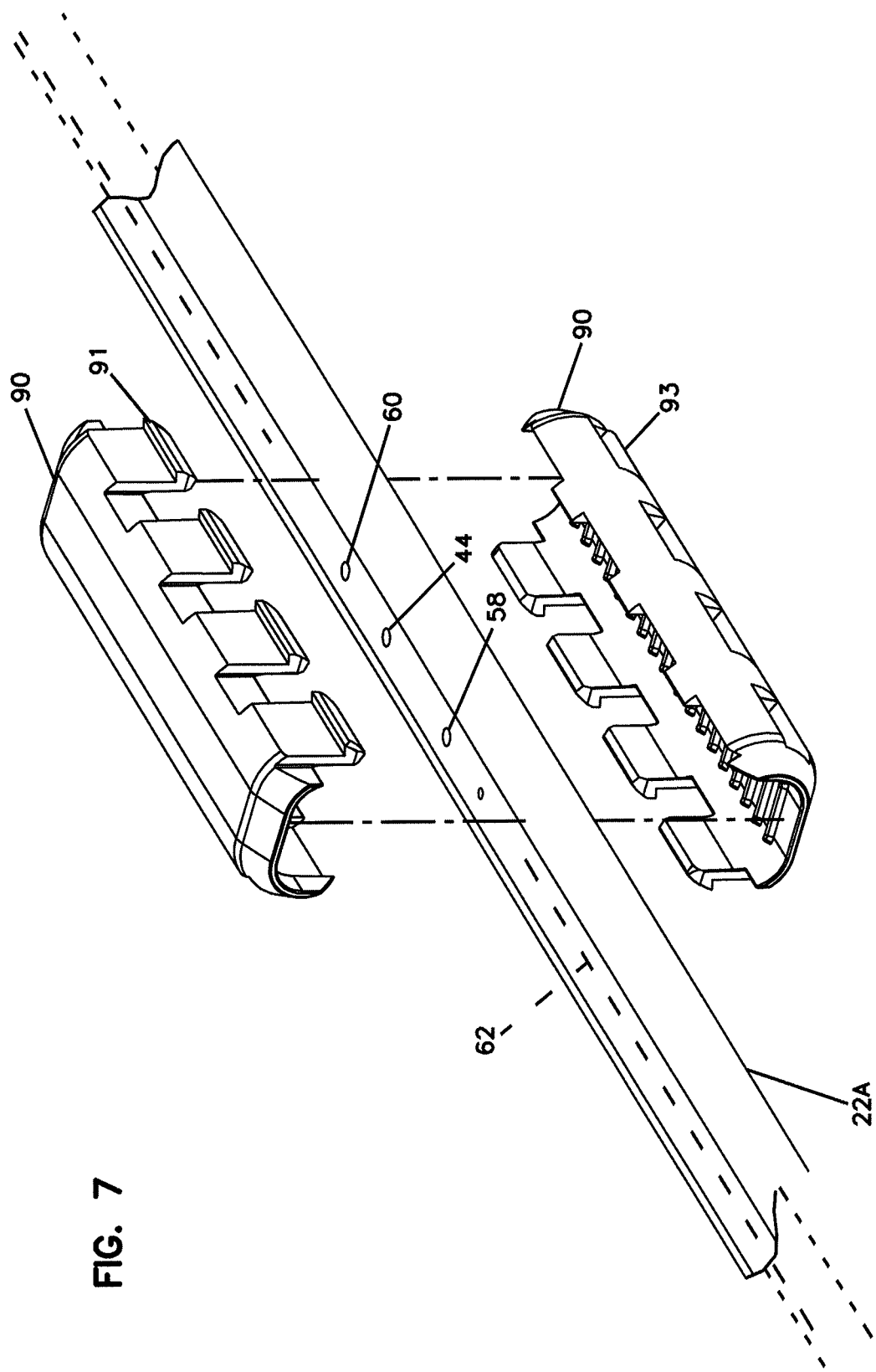
FIG. 7 is an exploded view showing an example shell arrangement for providing external enhanced rigidity and reinforcement of a cable along a fiber lock in accordance with the principles of the present disclosure.
Figure 8:
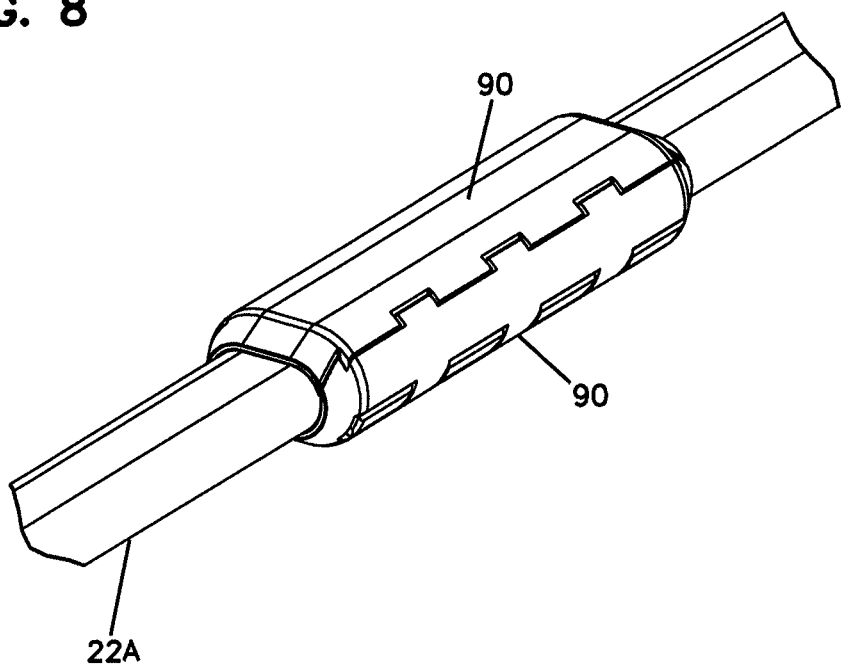
FIG. 8 shows the shell arrangement of FIG. 7 mounted on the fiber optic cable.
Figure 9:
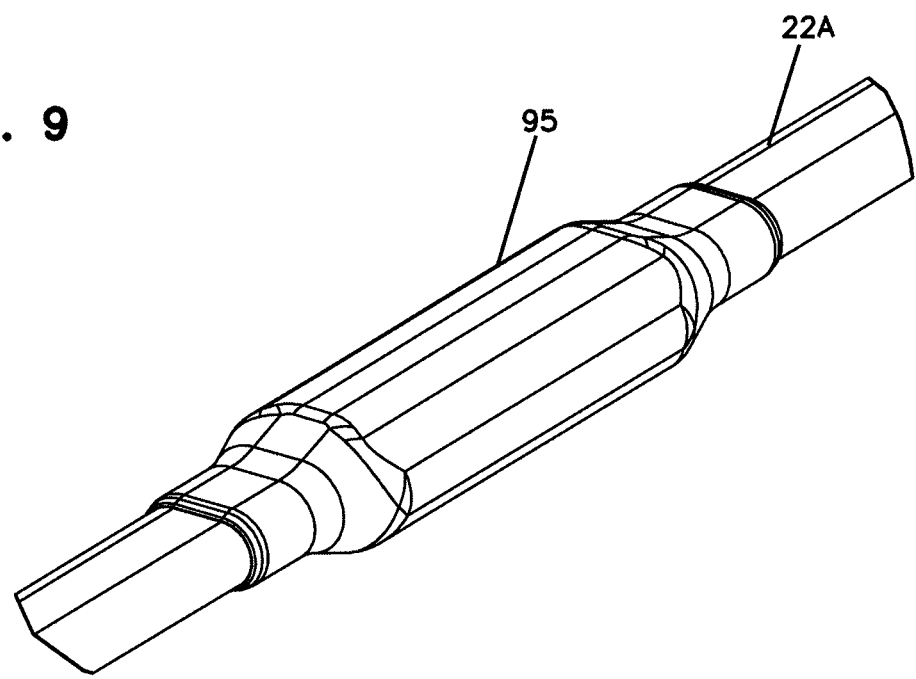
FIG. 9 shows the shell arrangement of FIG. 8 with a cover such as a heat shrink element mounted over the shell arrangement.
Figure 10:
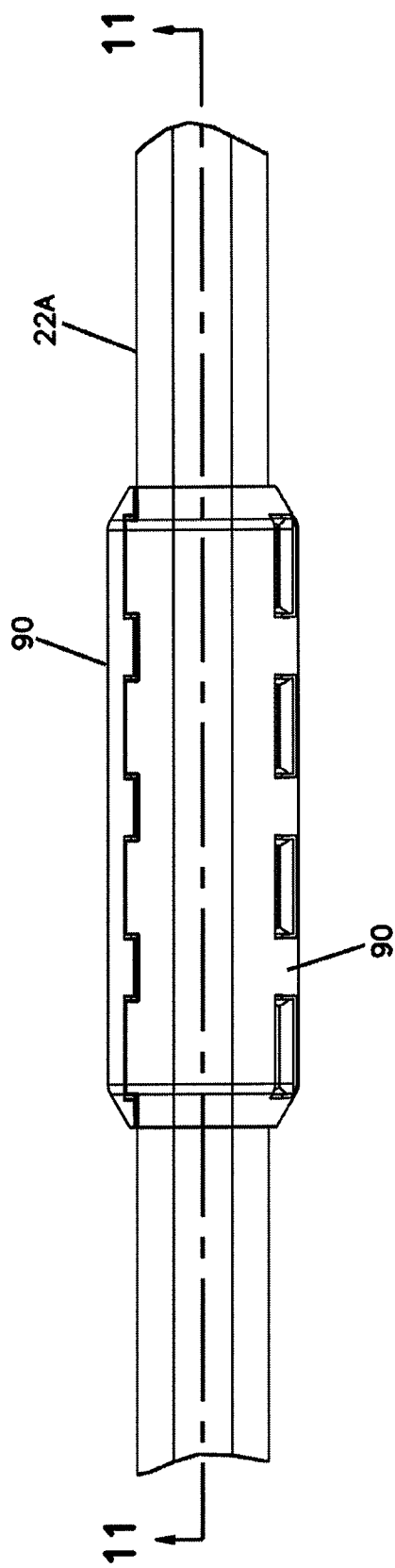
FIG. 10 is a top view of the shell arrangement and fiber optic cable of FIG. 8.

FIGS. 7 and 8 depict an example reinforcing structure including two half-shells 90 that snap together to form a shell arrangement for enhancing the rigidity of the fiber lock 36. The half-shells 90 include latching tabs 91 and tab receptacles 93 that provide a mechanical interlock in the form of a snap-fit connection when the half-shells 90 are mated together. FIG. 9 shows a cover 95 such as shape memory sleeve mounted over the assembled half-shells 90. FIG. 10 is a plan view of the assembled half-shells.

Figure 11:
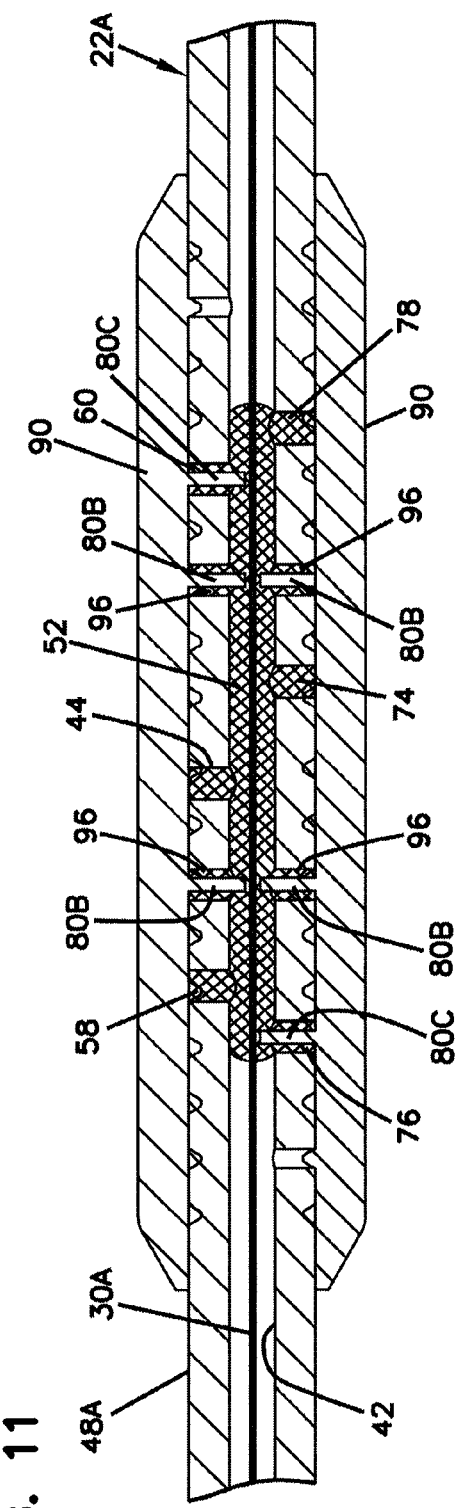
FIG. 11 is a cross-sectional view taken along section line 11-11 of FIG. 10, the cross-section depicts another fiber lock arrangement in accordance with the principles of the present disclosure.
Figure 12:
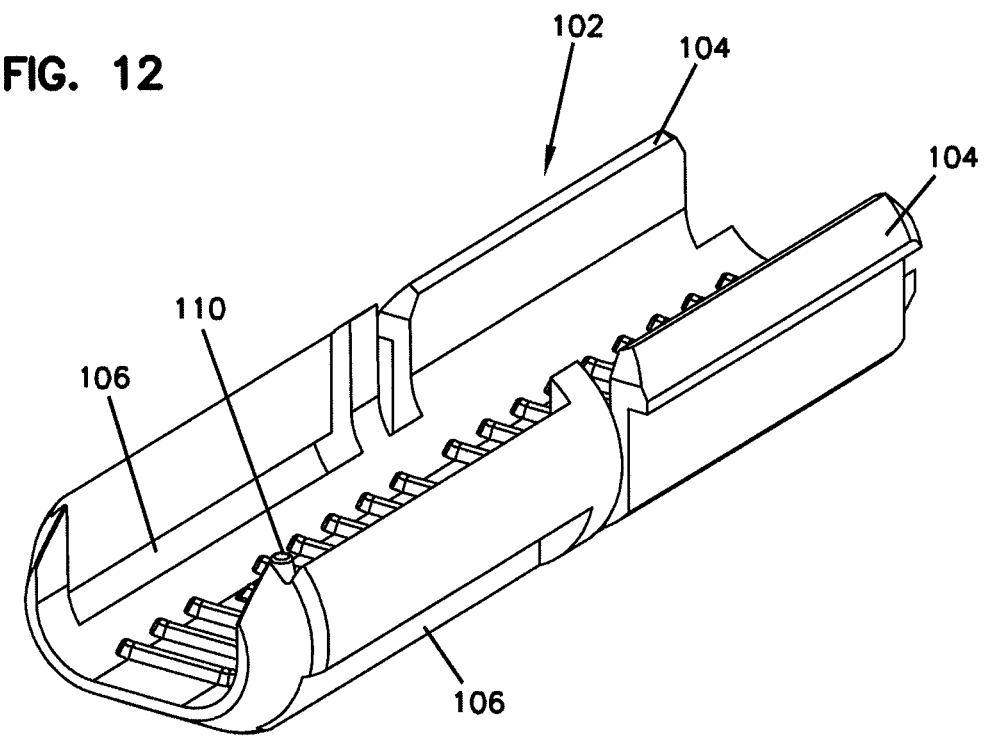
FIG. 12 is a first perspective view of an example half-shell of a shell arrangement for reinforcing a fiber lock in accordance with the principles of the present disclosure.
Figure 13:
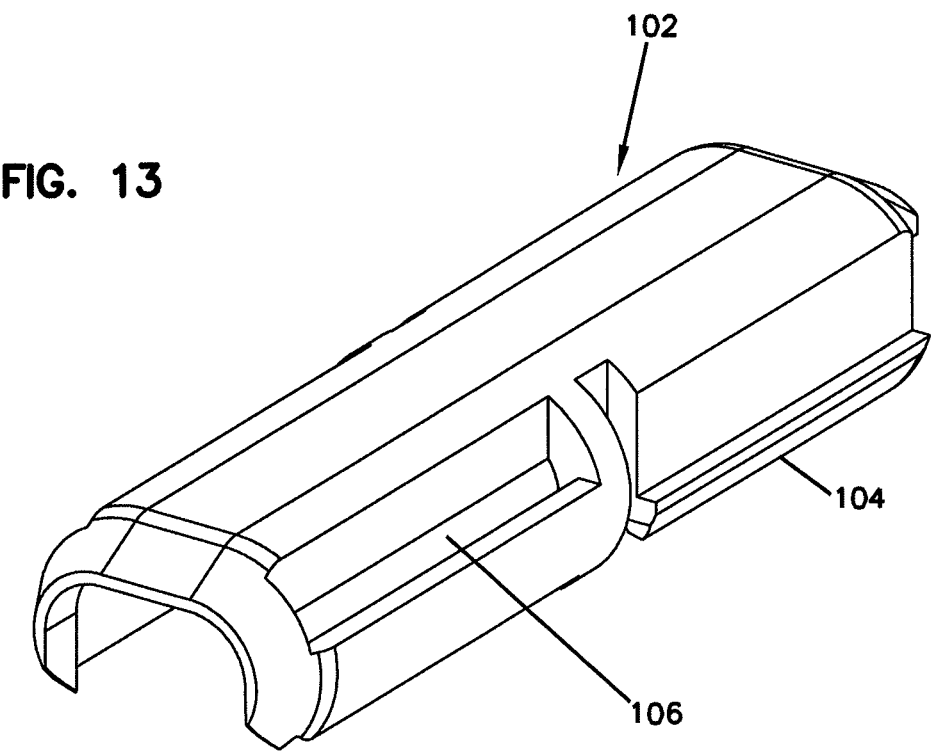
FIG. 13 is second, opposite perspective view of the half-shell of FIG. 12.
Figure 14:
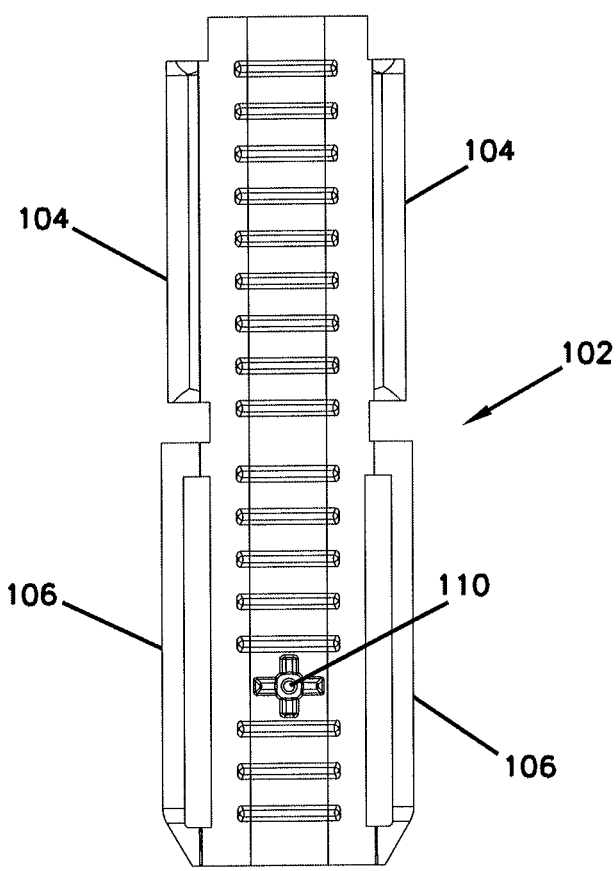
FIG. 14 is a plan view showing an inside of the half-shell of FIG. 12.
Figure 15:
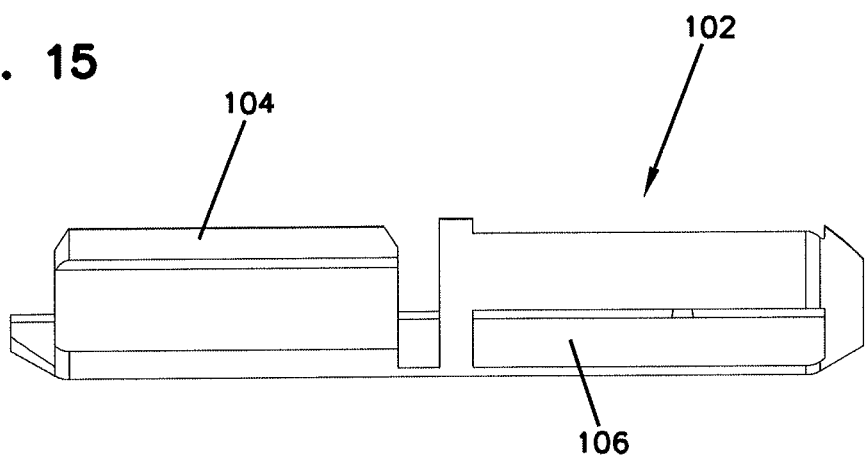
FIG. 15 is a side view of the half-shell of FIG. 12.
Figure 16:
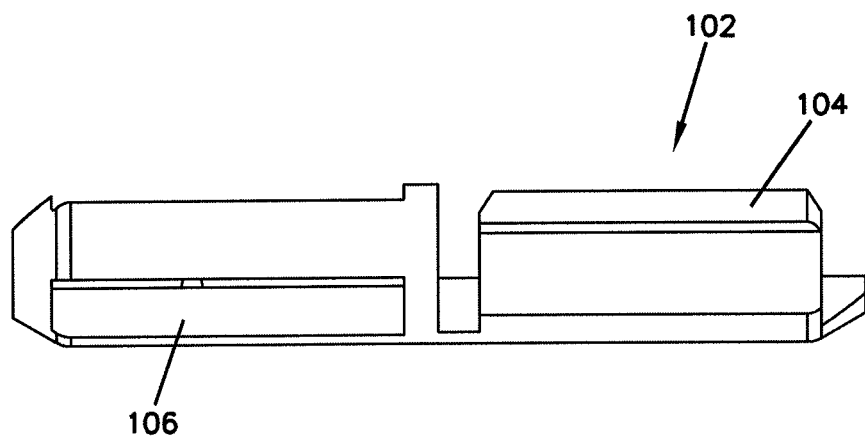
FIG. 16 is an opposite side view of the half-shell of FIG. 12.
Figure 17:
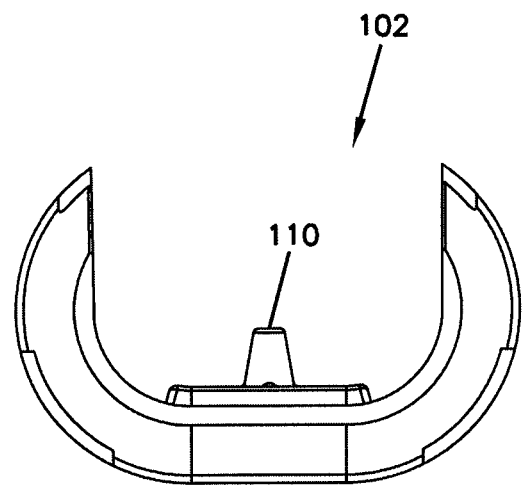
FIG. 17 is an end view of the half-shell of FIG. 12.

FIG. 11 shows the half-shells 90 equipped with integrated anchors 80B that oppose each other and that extend through anchor ports 96. The anchor ports 96 are defined through a jacket 48A of a fiber optic cable 22A that does not include an interior buffer tube. Instead, the outer jacket 48A of the cable itself defines a conduit passage 42 through which at least one optical fiber extends. At least one optical fiber 30A extends through the conduit passage 42. Preferably, a plurality of optical fibers 30A extends through the passage 42A. In certain examples, the plurality of optical fibers 30A can be ribbonized. Similar to previously described examples, a first set of ports 70 (e.g., adhesive injection port 44 and vent ports 58, 60) are defined laterally through one side of the jacket and a second set of ports 72 (e.g., adhesive injection port 74 and vent ports 76, 78) are defined laterally through an opposite side of the jacket The anchor ports 96 are defined through the jacket 48A at locations between the adhesive injection ports 44, 74 and their corresponding vent ports 58, 60 and 76, 78. The anchors 80B of each opposite mating half-shell 90 can be configured to oppose one another. The anchors 80B can be pins that extend into the conduit passage 42 and that embed within the main adhesive volume 52. In other examples, the anchors 80B may be longitudinally offset from one another so as to not directly oppose one another. The half-shells 90 are also shown including anchors 80C that extend through vent ports defined through the jacket 48A. The projections 80C are unitary with the half-shells 90 and are constructed as pins having free ends that are embedded within the main adhesive volume 52. In embodiments where anchors such as projections are embedded within the main adhesive volume 52, it is preferred for the anchors to be positioned within the main adhesive volume 52 before the main adhesive volume 52 is cured. For example, the half-shells 90 can be mounted on the cable 22A prior to curing the main adhesive volume 52.

In certain examples the projections 80A-80C can be pins that are depicted as being non-tapered. In other examples, one or more of the pins can be tapered along their lengths. As depicted, the pins have cross-dimensions that are smaller than their corresponding ports. In other examples, the pins can have cross-dimensions that are equal to or larger than the cross-dimensions of their corresponding ports. In certain examples, the pins can be press-fit within their corresponding ports such that the conduit wall deforms to allow the ports to expand to accommodate the pins. It will be appreciated that the shell arrangement can be mounted on the cable and the pins can be embedded in the adhesive after injection of the adhesive but before curing of the adhesive. Once the adhesive is cured, the pins are bonded to the adhesive and locked within the adhesive.

In certain examples, shells in accordance with the principles of the present disclosure include two half-shells that are identical and that are mated together. It is advantageous from a manufacturing efficiency perspective for the half-shells to be identical to one another. However, in other embodiments, two mated shells can have different, non-identical configurations. In this way, more design flexibility can be provided relating to providing anchors at different locations. Additionally, shells having more than two pieces are also contemplated.

Figure 18:
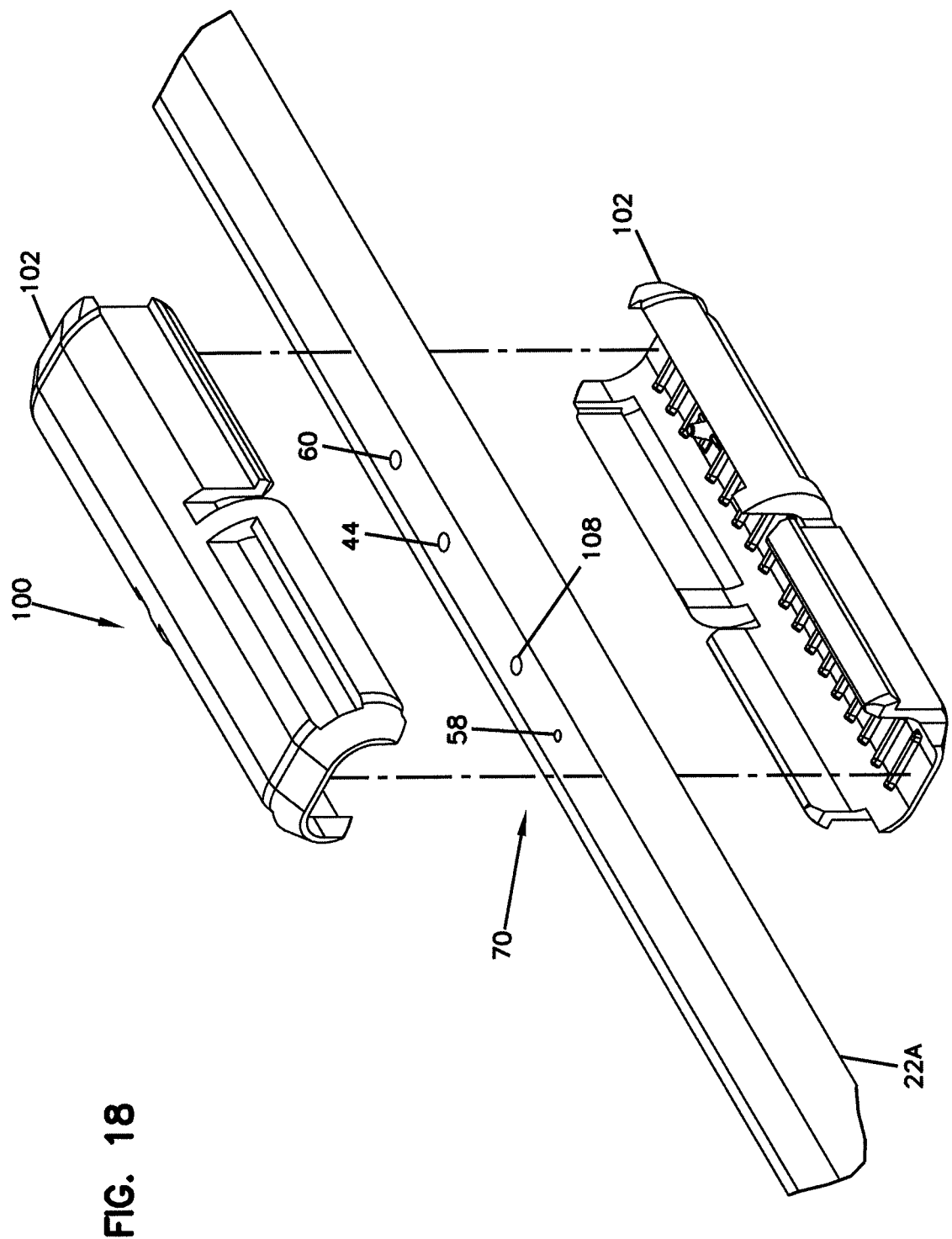
FIG. 18 is an exploded view showing two of the half-shells of FIG. 12 aligned with respect to a fiber lock region in accordance with the principles of the present disclosure.
Figure 19:
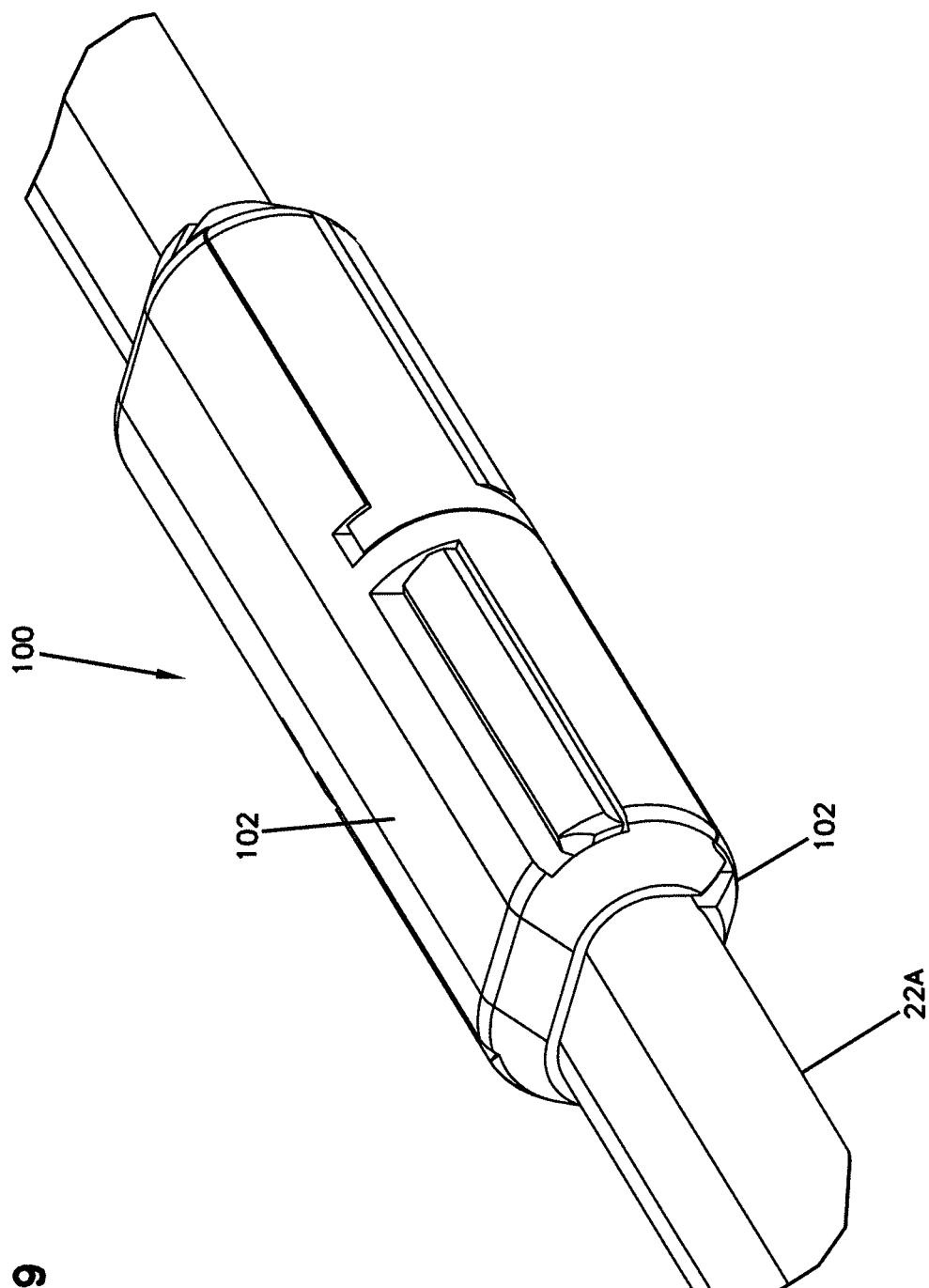
FIG. 19 is perspective view showing the half-shells of FIG. 18 assembled on the fiber optic cable.
Figure 20:
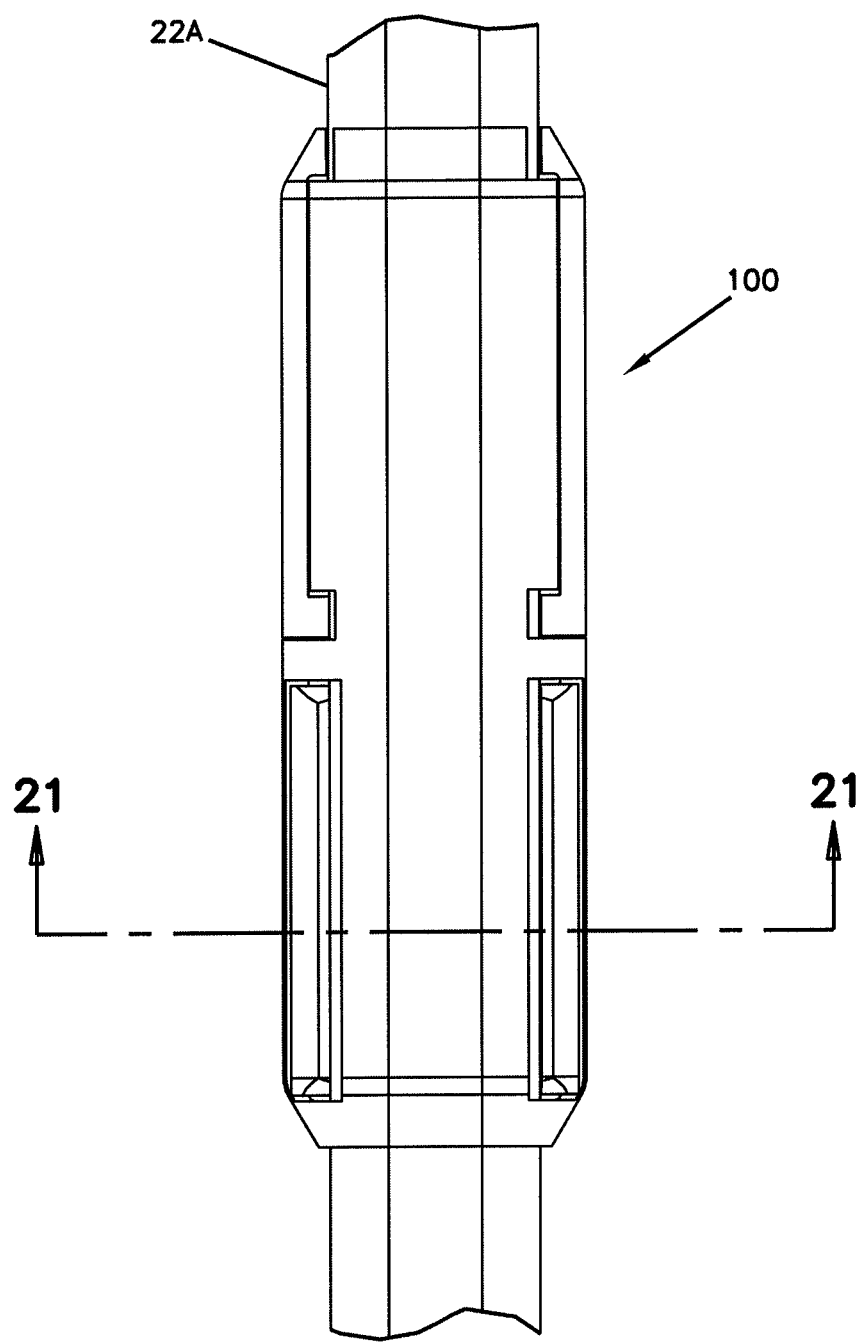
FIG. 20 is a top view of the shell arrangement of FIG. 19.
Figure 21:
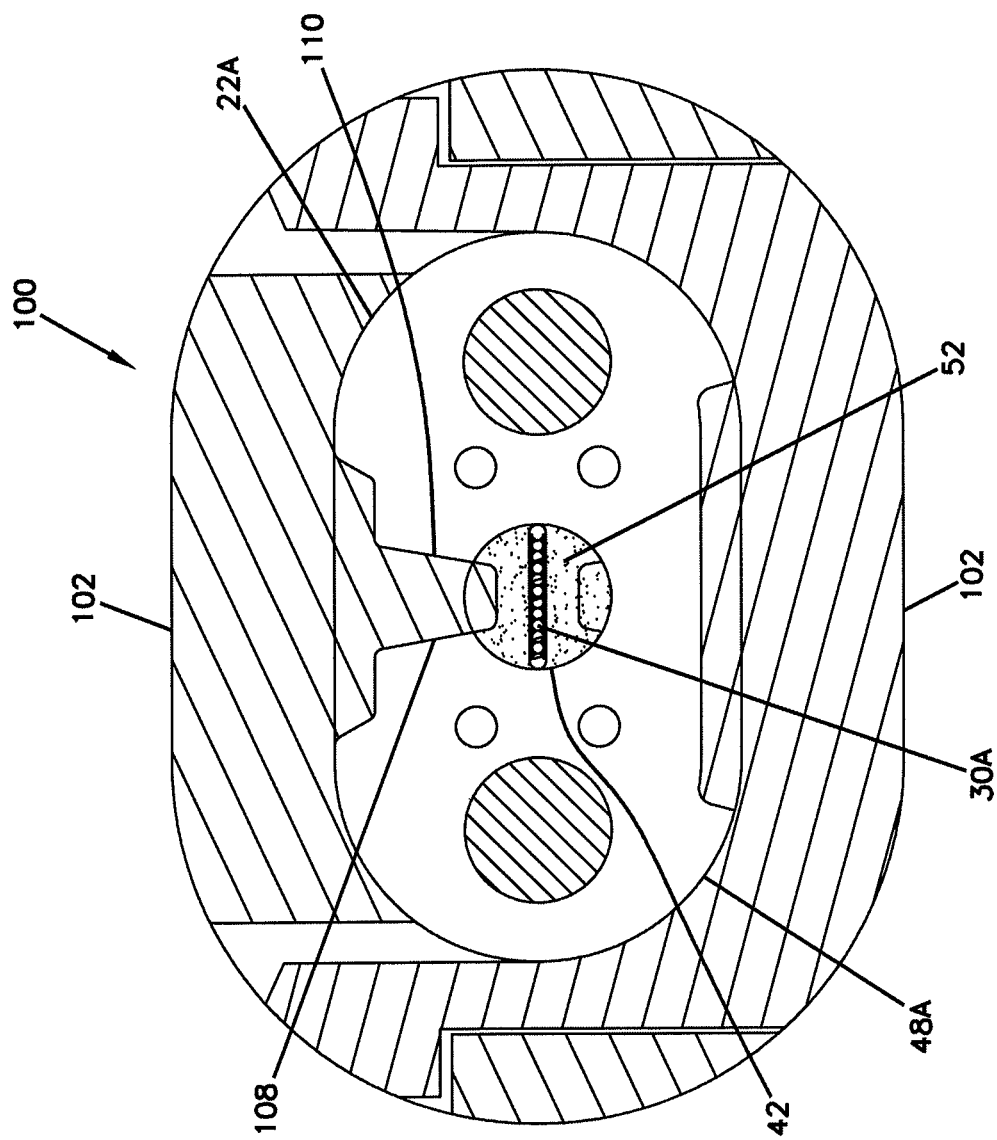
FIG. 21 is a cross-sectional view taken along section line 21-21 of FIG. 20.
Figure 22:
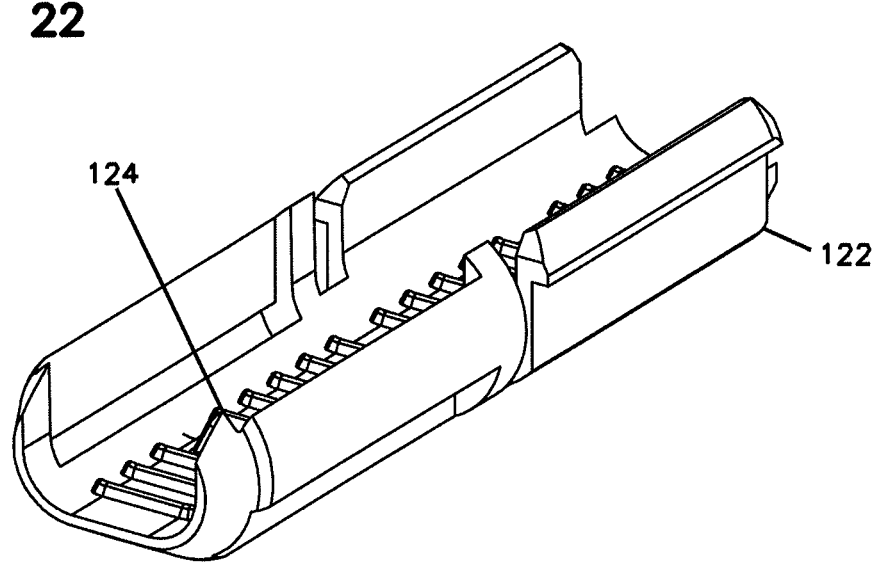
FIG. 22 is a first perspective view of another half-shell that is part of a shell arrangement for reinforcing a fiber-lock location along a fiber optic cable.
Figure 23:
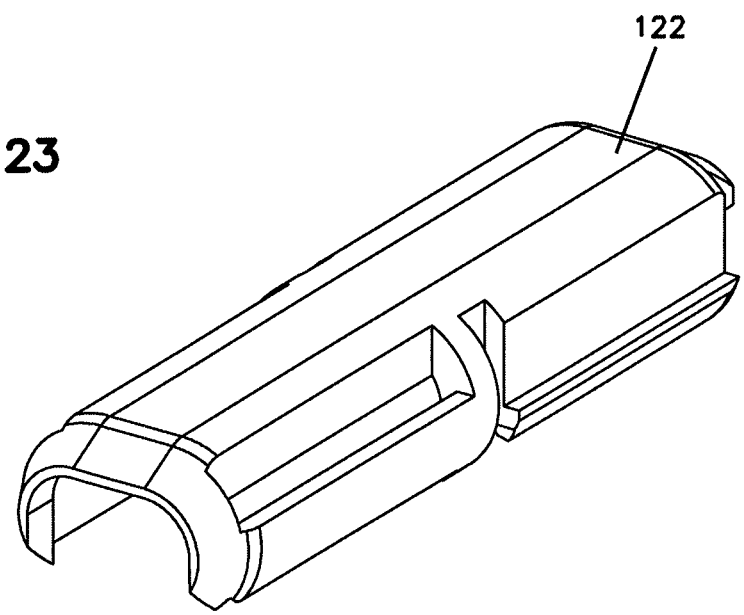
FIG. 23 is a second, opposite perspective view of the half-shell of FIG. 22.
Figure 24:
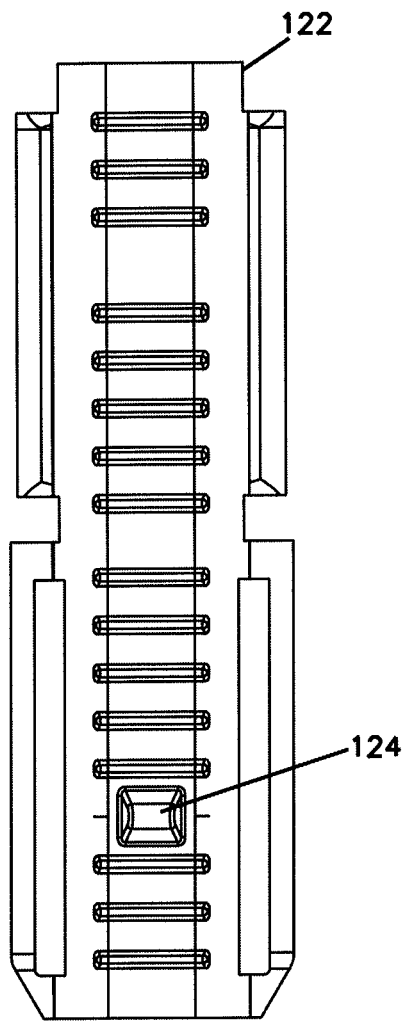
FIG. 24 is a plan view showing an inside of the half-shell of FIG. 22.
Figure 25:
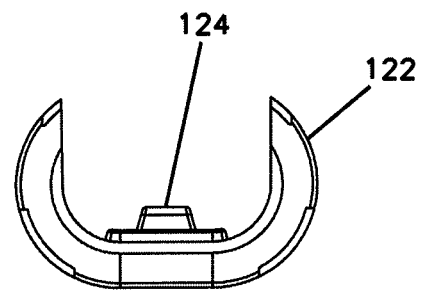
FIG. 25 is an end view of the half-shell of FIG. 22.
Figure 26:
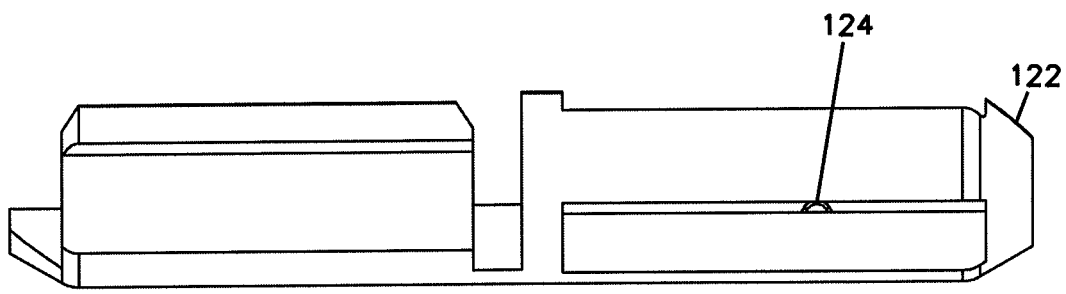
FIG. 26 is a side view of the half-shell of FIG. 22.
Figure 27:
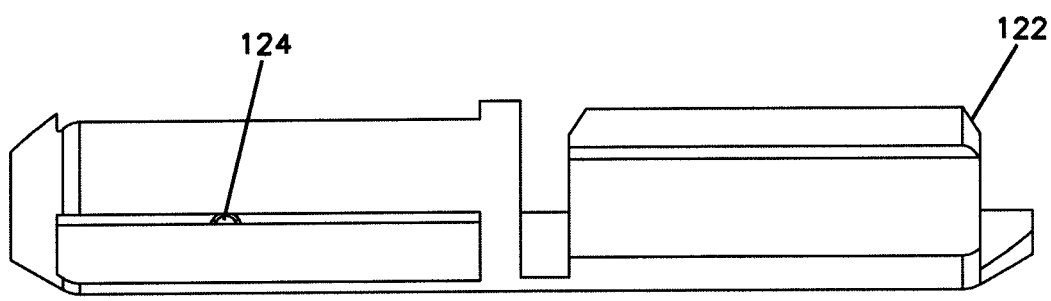
FIG. 27 is an opposite side view of the half-shell of FIG. 22.
Figure 28:
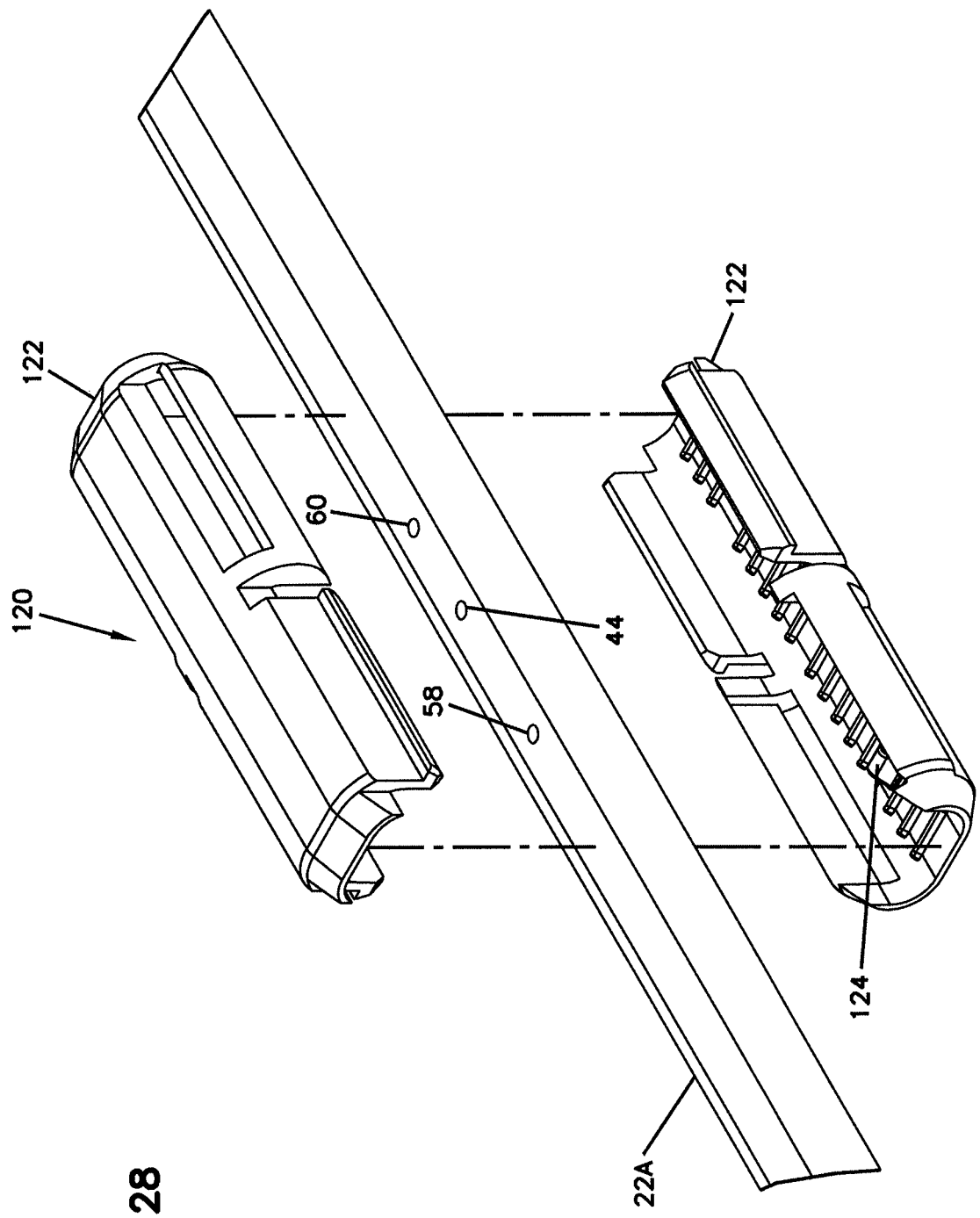
FIG. 28 shows two of the half-shells of the FIG. 22 aligned with a fiber-lock location of a fiber optic cable.
Figure 29:
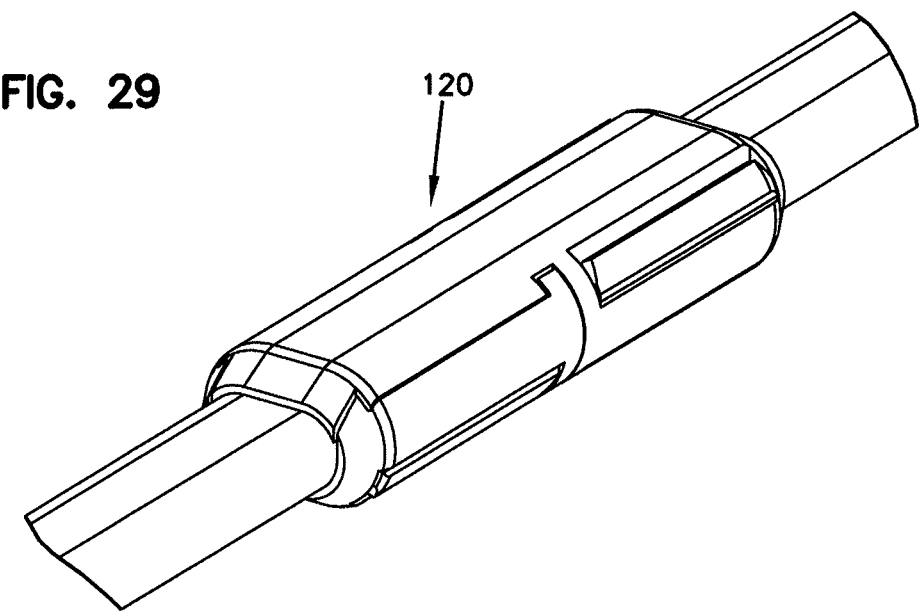
FIG. 29 shows the half-shells of FIG. 28 assembled on the fiber optic cable at the fiber-lock location.
Figure 30:
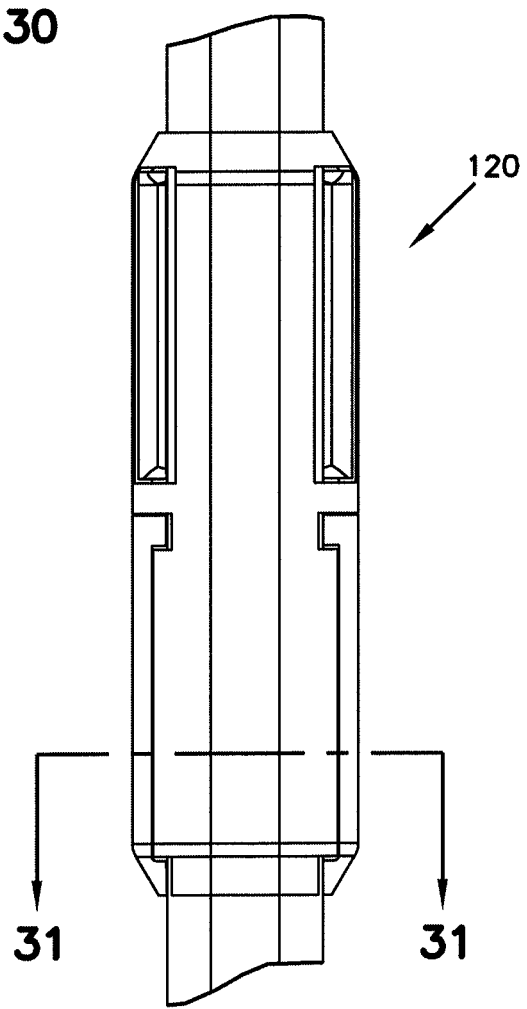
FIG. 30 is a top view of the shell arrangement of FIG. 29.

FIGS. 12-21 illustrate another shell arrangement 100 adapted to protect and provide rigidity to a fiber lock in accordance with the principles of the present disclosure. In certain examples, the shell arrangement 100 includes two half-shells 102 that are adapted to mate together by a snap-fit connection. In certain examples, the snap-fit connection is provided by an arrangement including two latches 104 and two latch receptacles 106. As shown at FIG. 18, the shell arrangement 100 can be mounted on the cable 22A of the type described above. The cable 22A can have an elongate transverse cross-section and can include a conduit passage 42 defined by the jacket 48A of the fiber optic cable 22A.

Optical fibers 30A are depicted as being arranged in a ribbon configuration provided within the conduit passage 42. A fiber lock location can include the first set of ports 70 (e.g., adhesive injection port 44 as well as first and second vent ports 58, 60) as shown at FIG. 18, and can also include the second set of ports 72 (not shown). Anchoring ports 108 can be provided between the adhesive injection ports and the vent ports. The half-shells 102 can each include at least one anchor 110 that is preferably integrated with the half-shells 102. For example, the anchor 110 can be unitarily molded as a single piece with each of the half-shells 102. In the depicted example, each of the half-shells 102 includes only one of the anchors 110. When the shell arrangement 100 is mounted on the fiber optic cable 22A, the anchors 110 project through the anchoring ports 108 and embed with the main adhesive volume 52 within the conduit passage 42 such that an interlock is formed between the anchors 110 and the main adhesive volume 52 when the main adhesive volume 52 is cured. In certain examples, the anchors 110 are pins. When the half-shells 102 are mounted on the fiber optic cable 22A, the anchors 110 of each of the half-shells 102 are longitudinally offset from one another.

Figure 31:
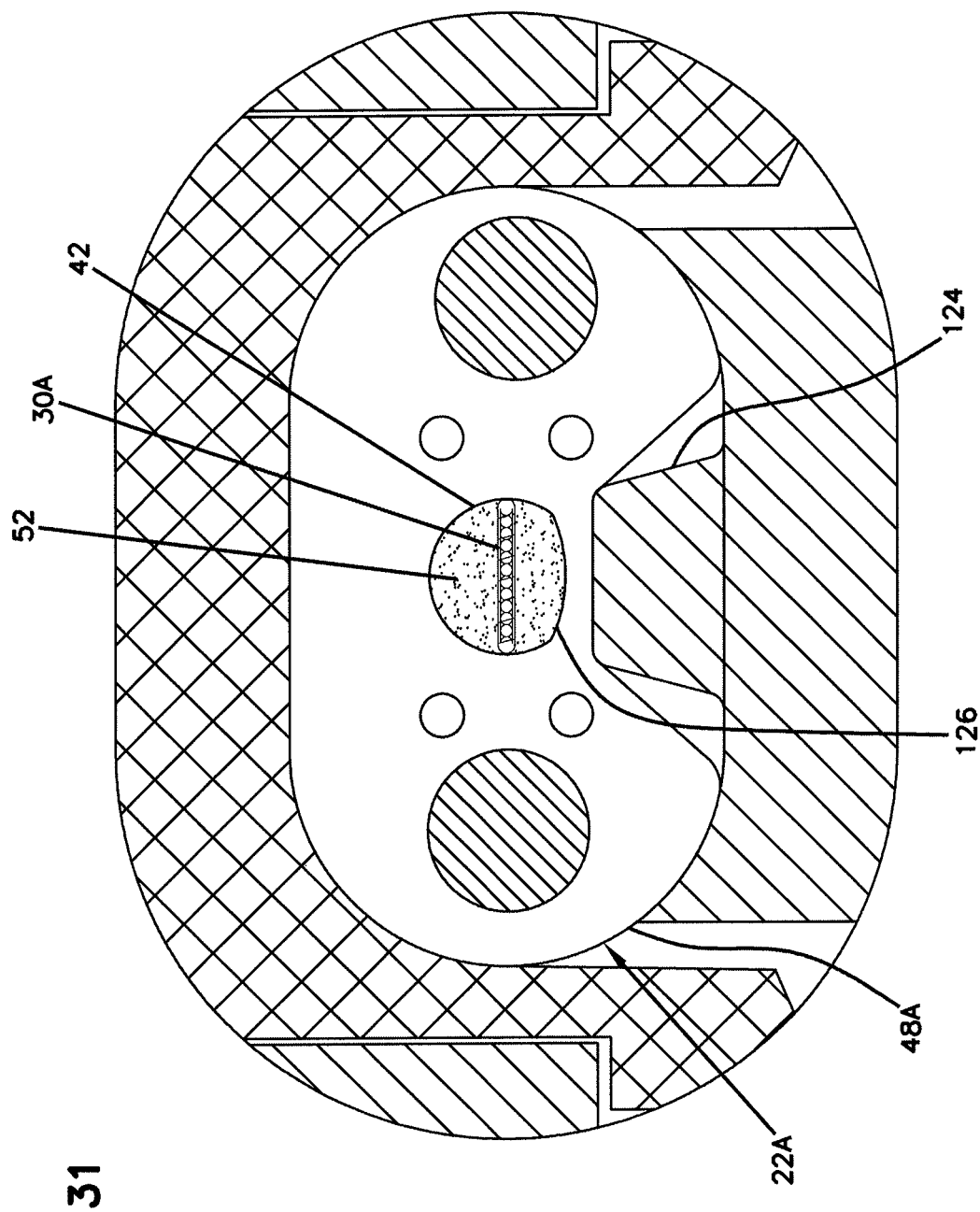
FIG. 31 is a cross-sectional view taken along section line 31-31 of FIG. 30.
Figure 32:
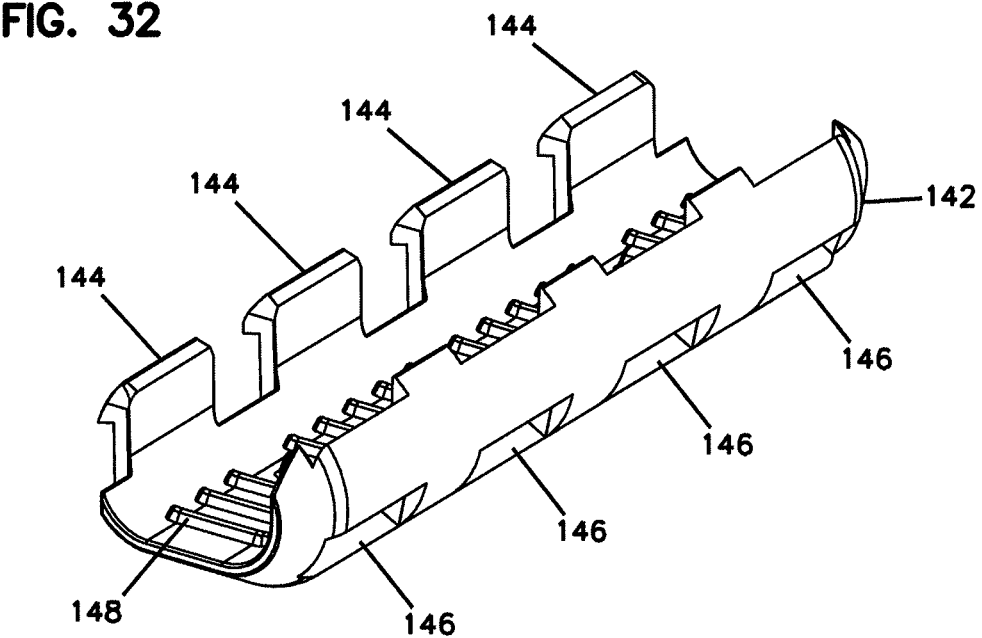
FIG. 32 is a first perspective view of still another half-shell that is part of a shell arrangement in accordance with the principles of the present disclosure for reinforcing a fiber-lock location along a fiber optic cable.
Figure 33:
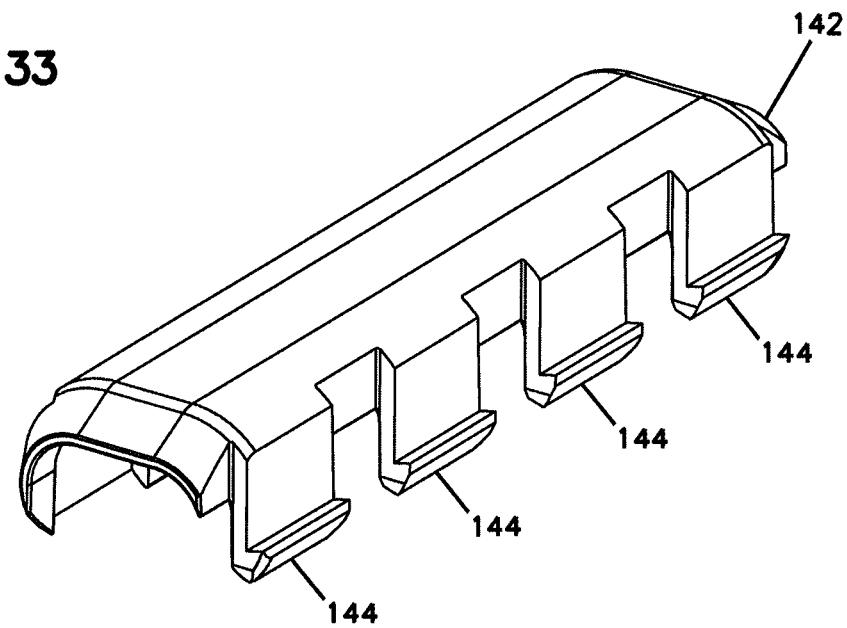
FIG. 33 is a second, opposite perspective view of the half-shell of FIG. 32.
Figure 34:
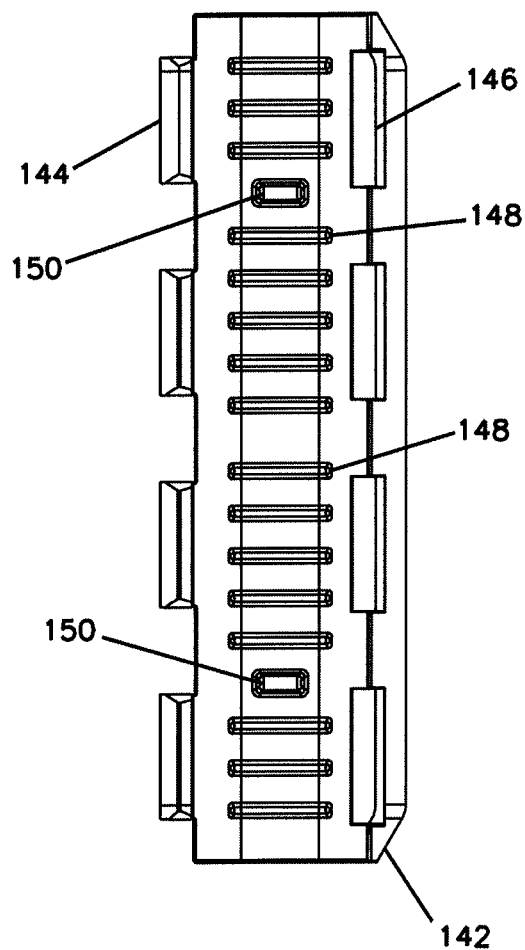
FIG. 34 is a plan view showing an inside of the half-shell of FIG. 32.
Figure 35:
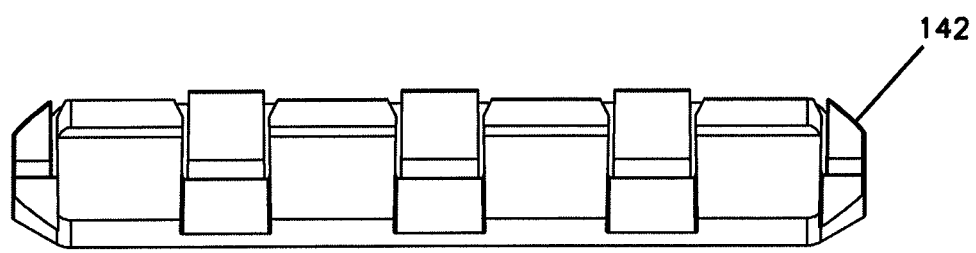
FIG. 35 is a first side view of the half-shell of FIG. 32.
Figure 36:
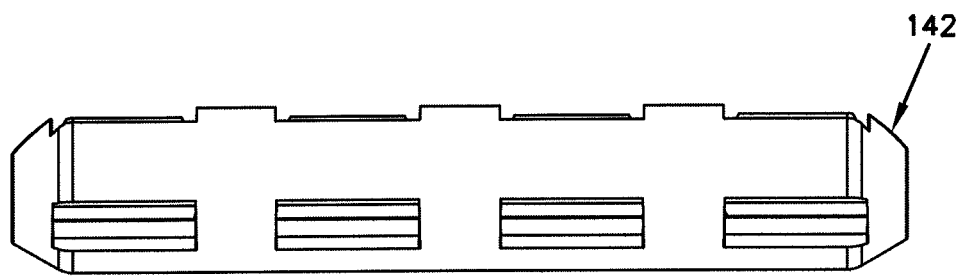
FIG. 36 is a second, opposite side view of the half-shell of FIG. 32.
Figure 37:
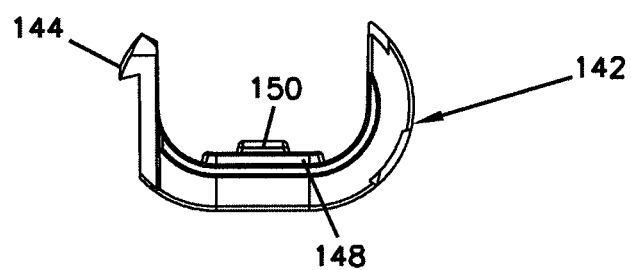
FIG. 37 is end view of the half-shell of FIG. 32.
Figure 38:
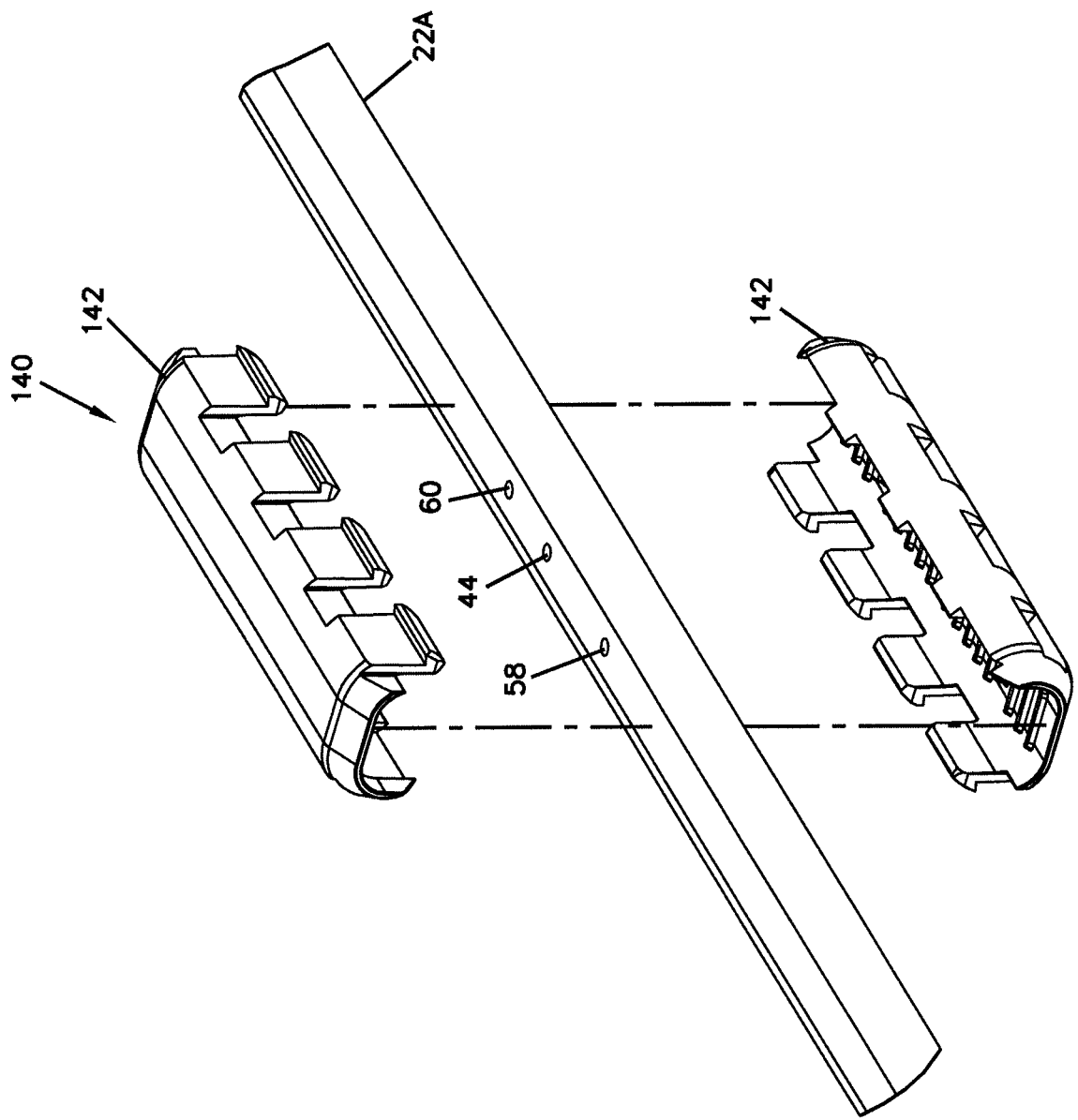
FIG. 38 shows two of the half-shells of FIG. 32 that form a shell arrangement for reinforcing a fiber-lock location along the length of a fiber optic cable, the half-shells are shown exploded relative to the fiber-lock location.
Figure 39:
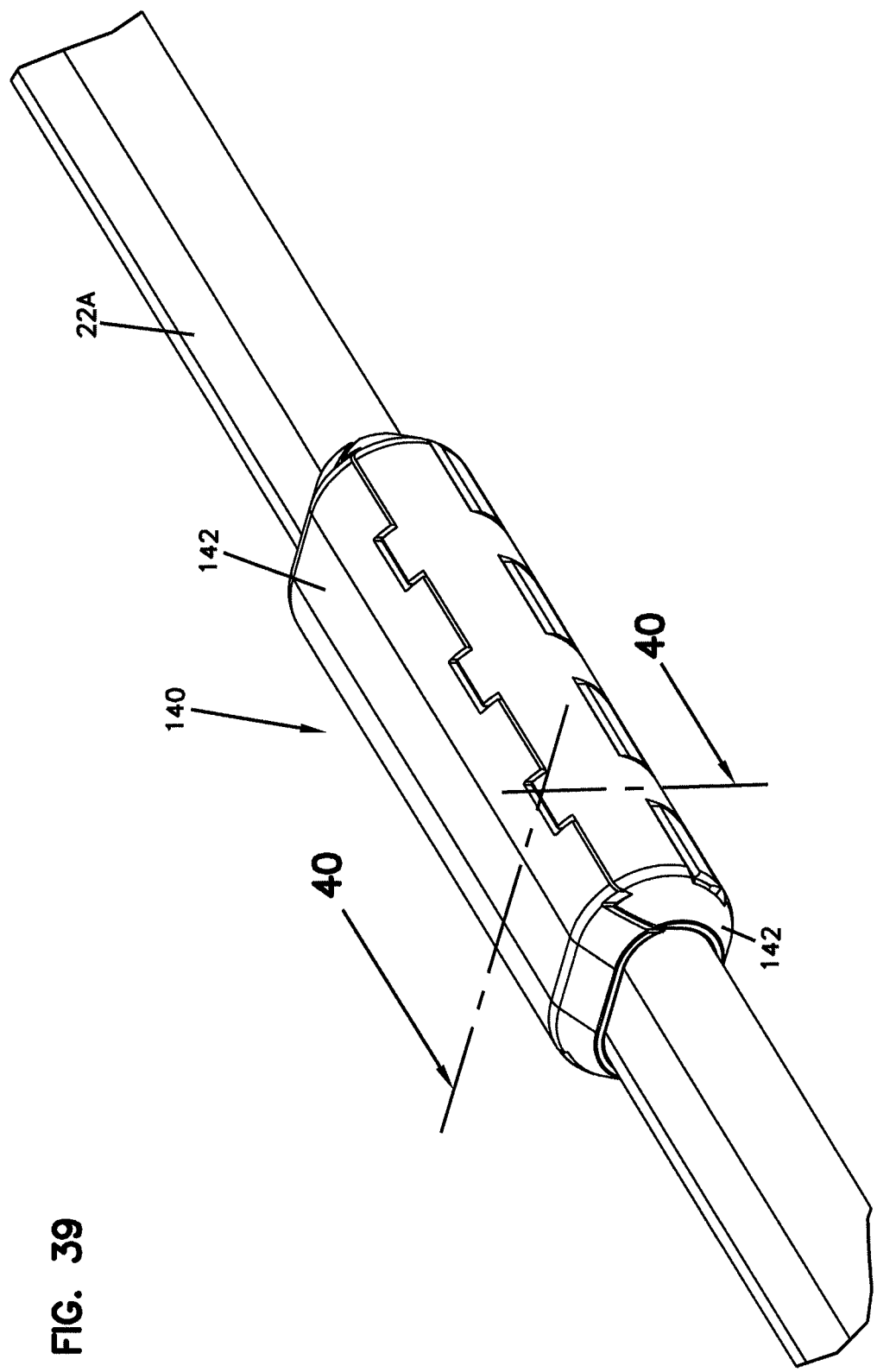
FIG. 39 shows the half-shells of FIG. 38 mounted at the fiber-lock location of the fiber optic cable.

FIGS. 22-31 illustrate another shell arrangement 120 in accordance with the principles of the present disclosure. The shell arrangement 120 includes two mating half-shells 122 adapted to form a protective enclosure over a location where optical fibers are locked in place by a main adhesive volume such as the main adhesive volume 52. The shells 122 have snap-fit interlocks of the type described with respect to shells 102. Each of the half-shells 122 includes a pressing projection 124 in certain examples, the pressing projections 124 can be unitarily formed with the half-shells 122. When the half-shells 122 are mounted about a fiber optic cable such as the fiber optic cable 22A, the pressing projections 124 press into the jacket 48A of the fiber optic cable 22A thereby causing an inward deformation 126 defined by the conduit wall (e.g., the wall of the jacket 48A in the present example) that protrudes into the conduit passage 42 and engages the main adhesive volume 52. The inward deformation 126 is shown at FIG. 31 where the shell arrangement 120 is shown mounted on the fiber optic cable 22A. It will be appreciated that the shell arrangement 120 is preferably mounted on the cable 22A prior to curing the main adhesive volume 52. In certain examples, the inward deformations 126 can be provided at locations along the longitudinal length L of the main adhesive volume 52. In certain examples, the inward deformations 126 are longitudinally offset from one another. In certain examples, each of the half-shells 122 includes only one of the pressing projections 124. In certain examples, the inward deformations 126 are located between the adhesive injection ports 44, 74 and one of their corresponding vent ports 58, 60 and 76, 78. In certain examples, the inward deformation 126 is embedded in the main adhesive volume 52. In certain examples, the inward deformation forms an obstruction within the conduit passage 42 that interfaces with the main adhesive volume to block longitudinal movement of the main adhesive volume 50 relative to the conduit (e.g., relative to the jacket 48A in the present example). In certain examples, the inward deformations 126 interlocks with the main adhesive volume. In certain examples, the inward deformation 126 reduces a cross-dimension of the conduit passage 42 by at least 5%. In certain examples, the inward deformation reduces a cross-dimension of the conduit passage by at least 10%.

Figure 40:
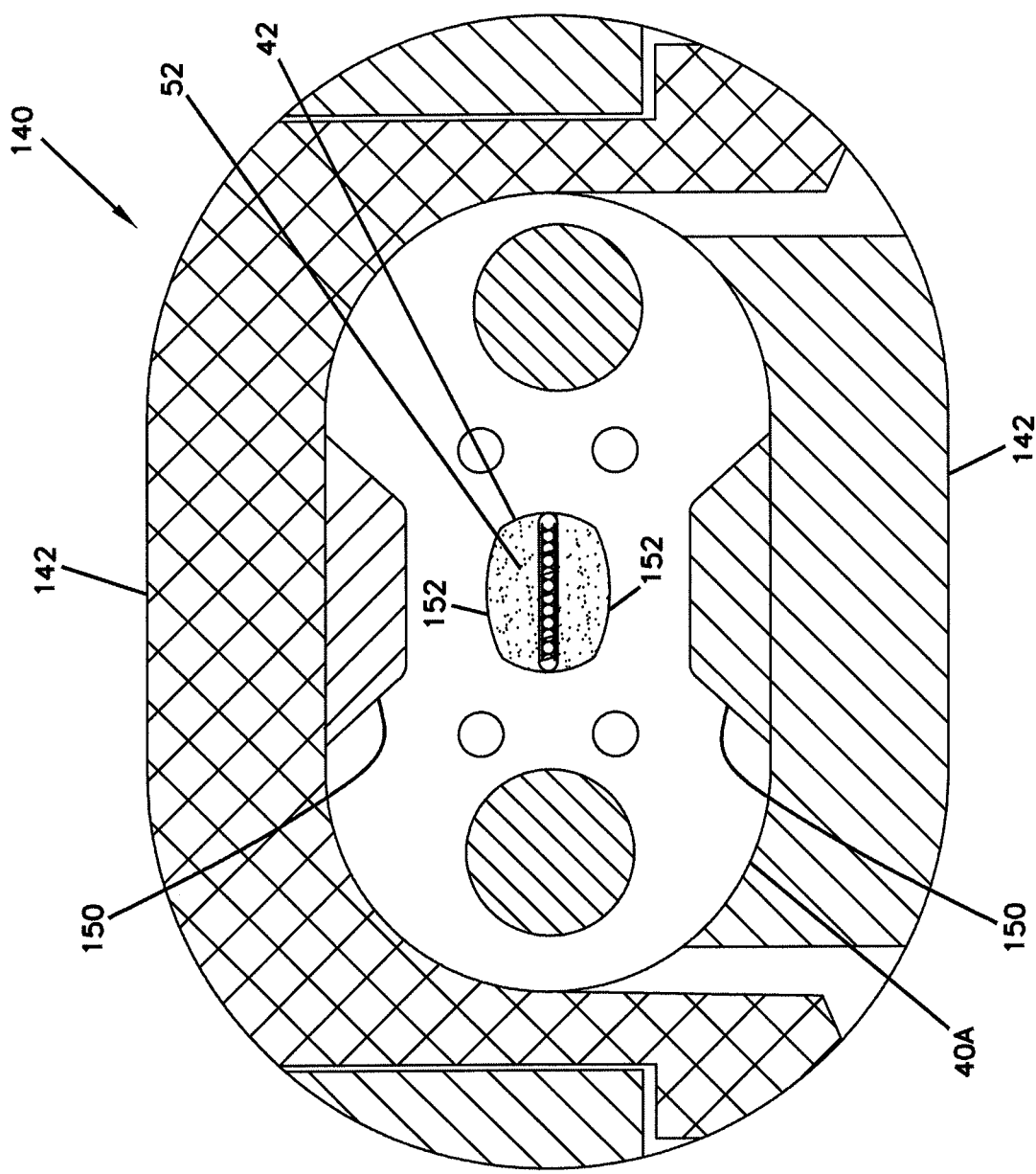
FIG. 40 is cross-sectional view taken along section line 40-40 of FIG. 39.
Figure 41:
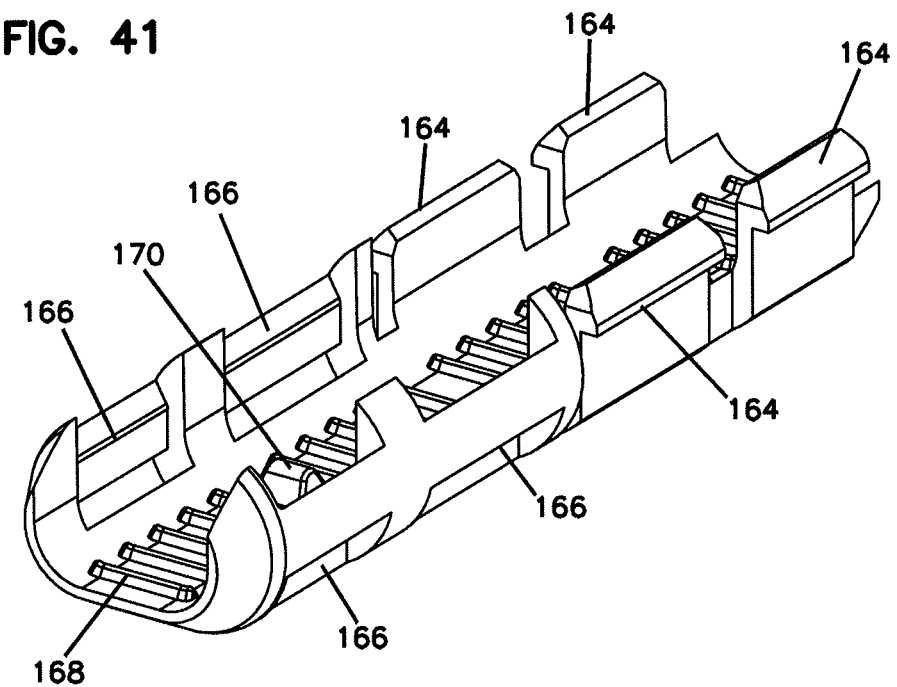
FIG. 41 is a first perspective view of the further half-shell that is part of a shell arrangement for reinforcing a fiber-lock location along a fiber optic cable.
Figure 42:
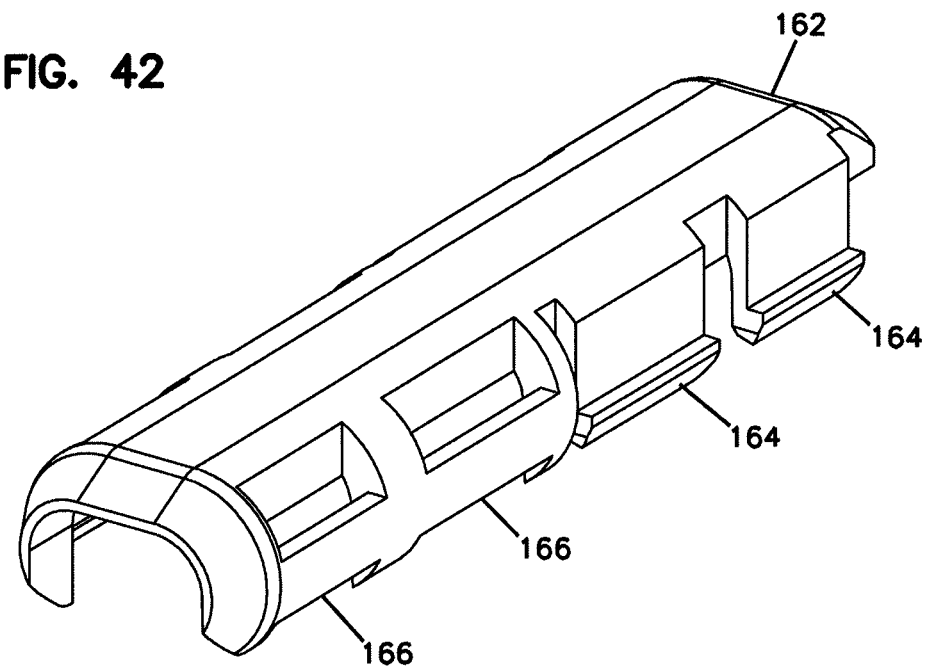
FIG. 42 is a second, opposite perspective view of the half-shell of FIG. 41.
Figure 43:
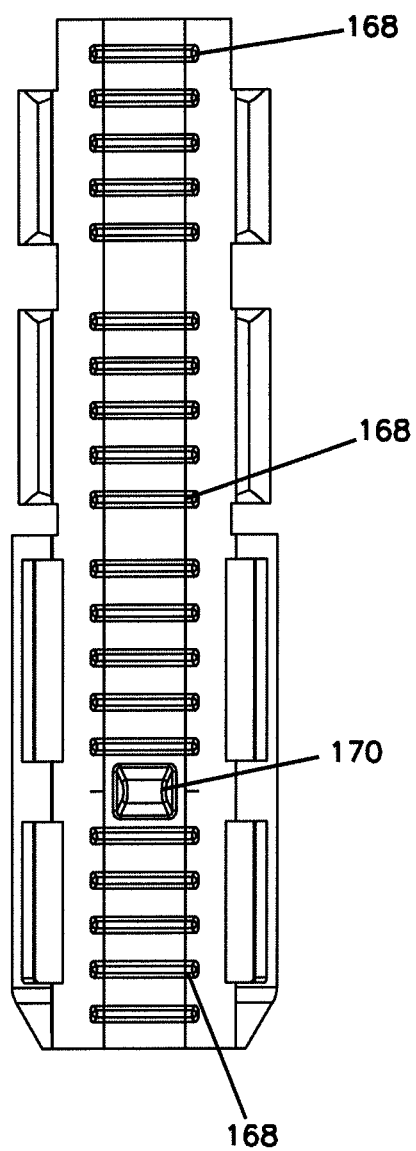
FIG. 43 is a plan view showing an inside the half-shell of FIG. 41.
Figure 44:
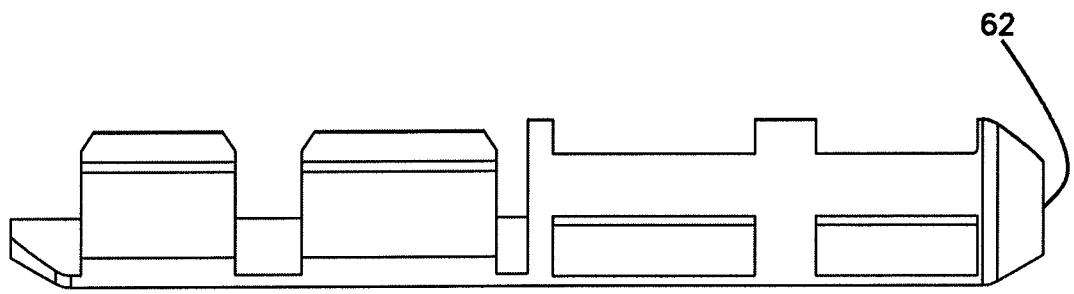
FIG. 44 is a first side view of the half-shell of FIG. 41.
Figure 45:
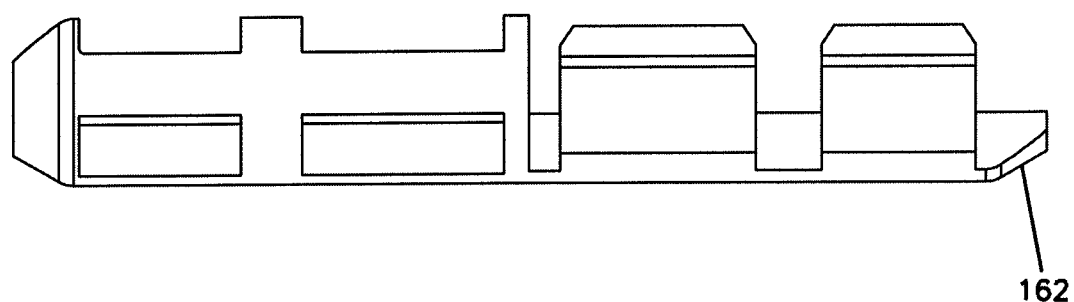
FIG. 45 is a second, opposite side view of the half-shell of FIG. 41.
Figure 46:
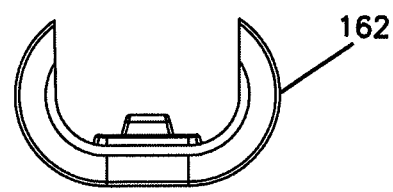
FIG. 46 is an end view of the half-shell of FIG. 41.
Figure 47:
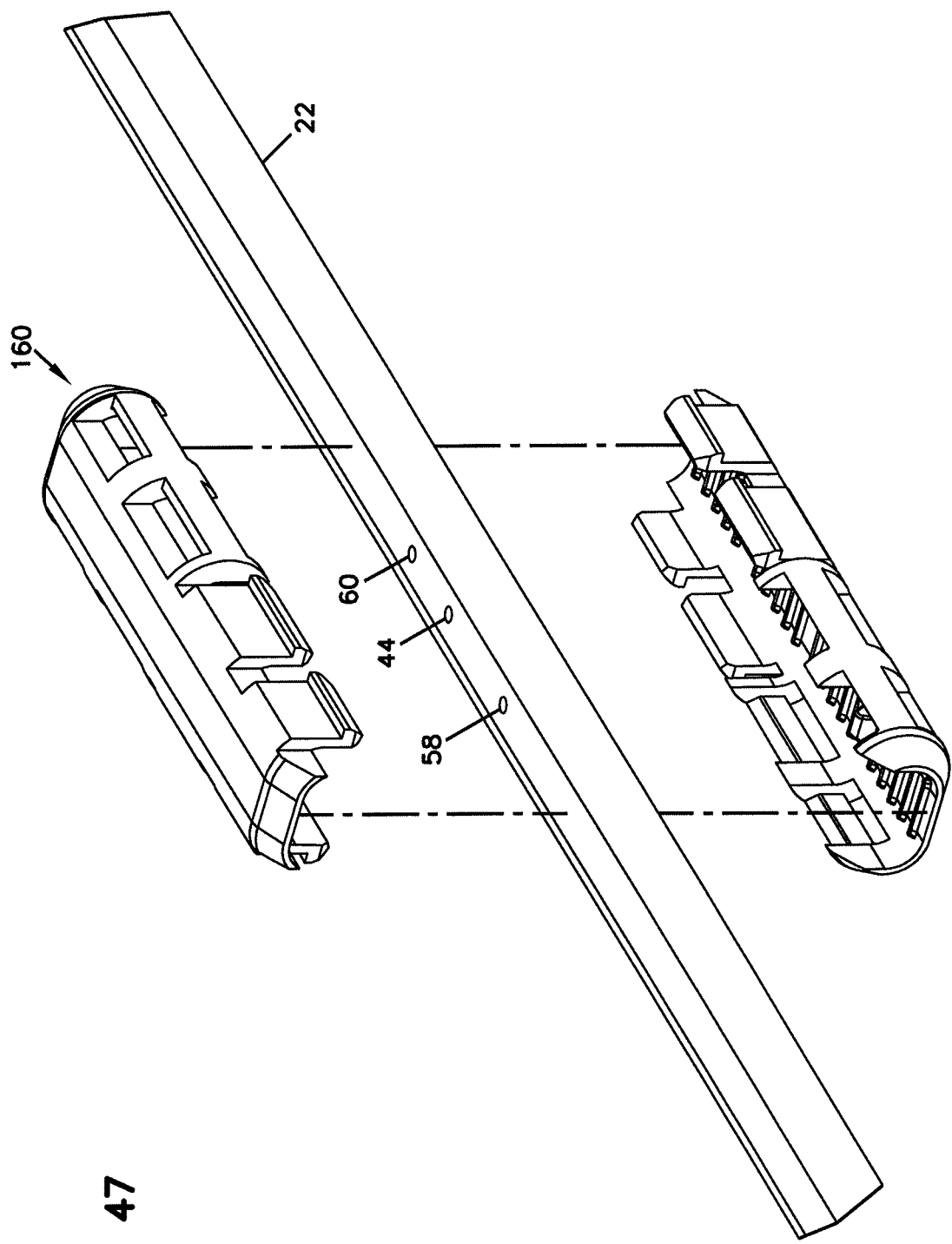
FIG. 47 is an exploded view showing two of the half-shells of FIG. 41 forming a shell assembly aligned with a fiber lock location of a fiber optic cable.
Figure 48:
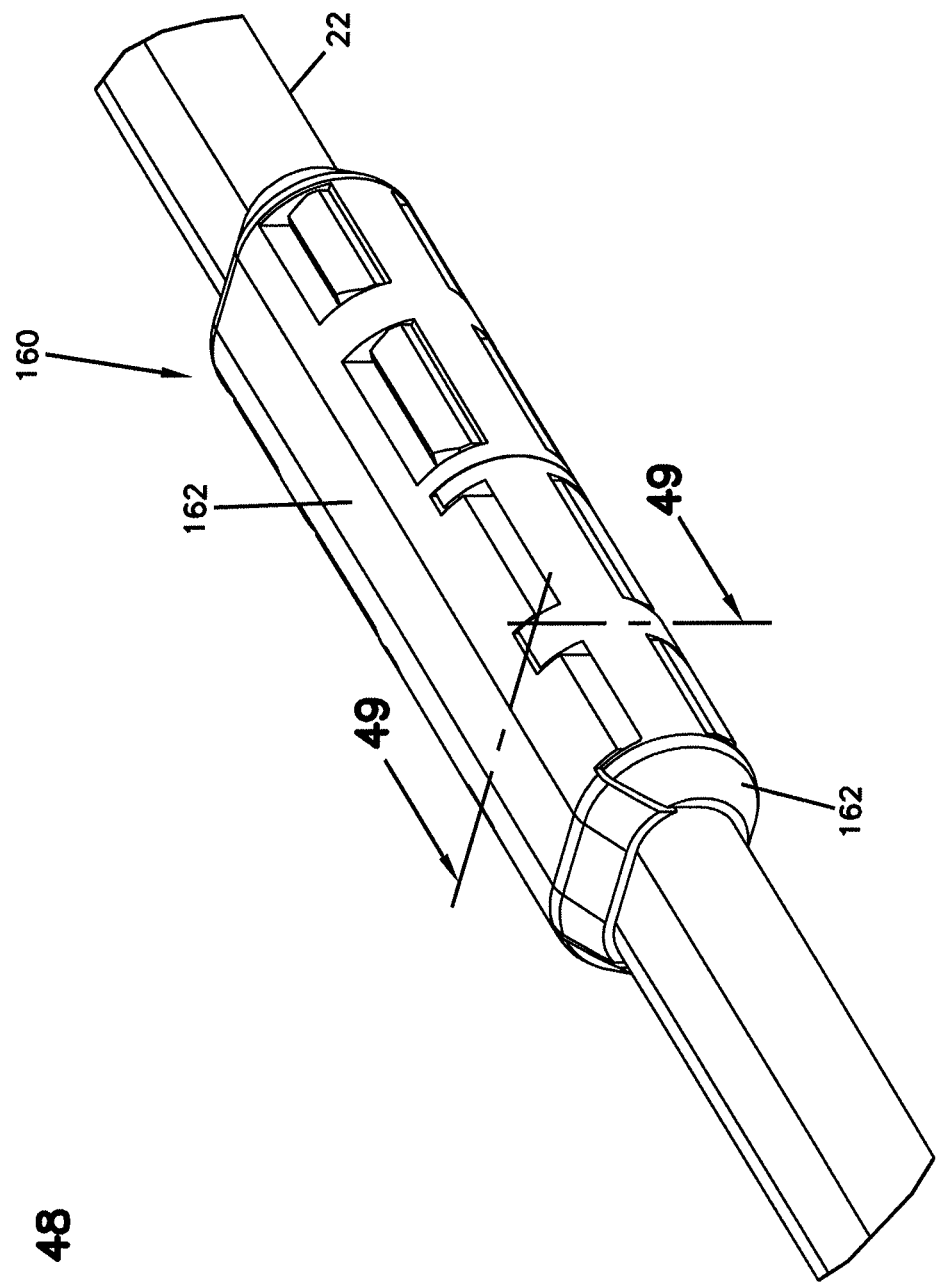
FIG. 48 shows the shell arrangement of FIG. 47 mounted on the fiber optic cable.

FIGS. 32-40 illustrate still another shell arrangement 140 in accordance with the principles of the present disclosure. The shell arrangement 140 is adapted for reinforcing a longitudinal length of fiber optic cable having an adhesive volume therein for fixing optical fibers. The shell arrangement 140 includes two half-shells 142 that snap together to form an enclosure that clamps about a fiber optic cable. In the depicted example, each of the half-shells 142 includes four snap-latches 144 and four latch-receptacles 146. The interior of each of the half-shells 142 includes plurality of ribs 148 adapted to embed within the jacket of the fiber optic cable when the shell arrangement 140 is snapped on the fiber optic cable. Each of the half-shells 142 also includes two longitudinally spaced-apart pressing projections 150. Each of the pressing projections 150 has a projection length that is longer than the projection lengths of the individual ribs 148. In certain examples, the pressing projections 150 are projection lengths that are at least twice the corresponding projection lengths of the ribs 148. As shown at FIG. 40, when the shell arrangement 140 is snapped over the fiber optic cable 22A, the pressing projections 150 press into the jacket 48A at opposite sides of the jacket 148A. This causes the material of the jacket 148 to deform inwardly thereby forming the conduit passage 42. For example, the pressing projections 140 cause the material of the jacket 48A to deform inwardly so as to define inward deformations 152 at opposite sides of the conduit passage 42. The pressing projections 150 of the mating half-shells 142 oppose one another so as to maximize deformation of the conduit passage 42. In any of the examples disclosed herein, the shell arrangements can be covered with a protective layer such as a heat-shrink tube, a lap layer or an over-mold layer.

Figure 49:
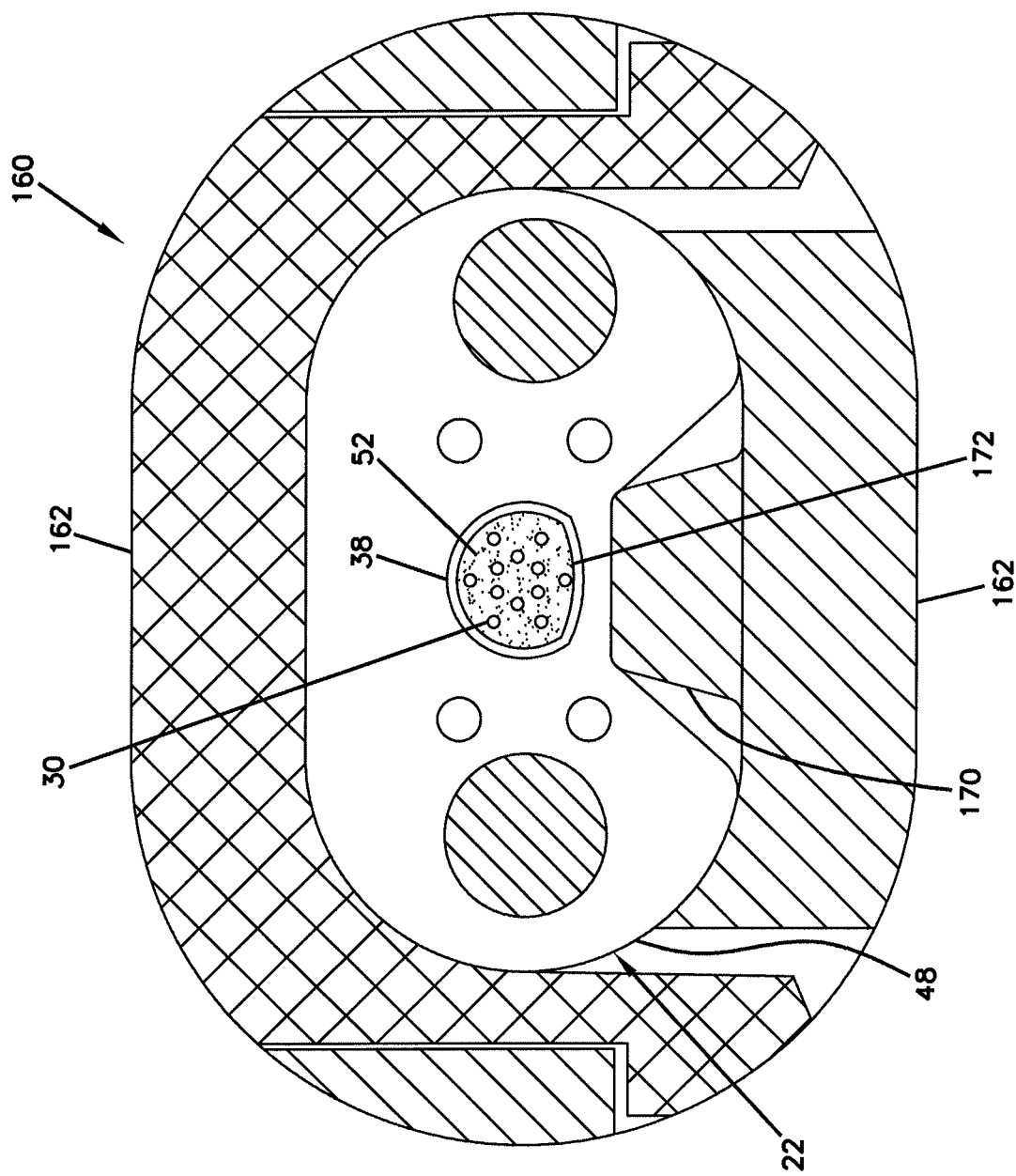
FIG. 49 is a cross-sectional view taken along section line 49-49 of FIG. 48.
Figure 50:
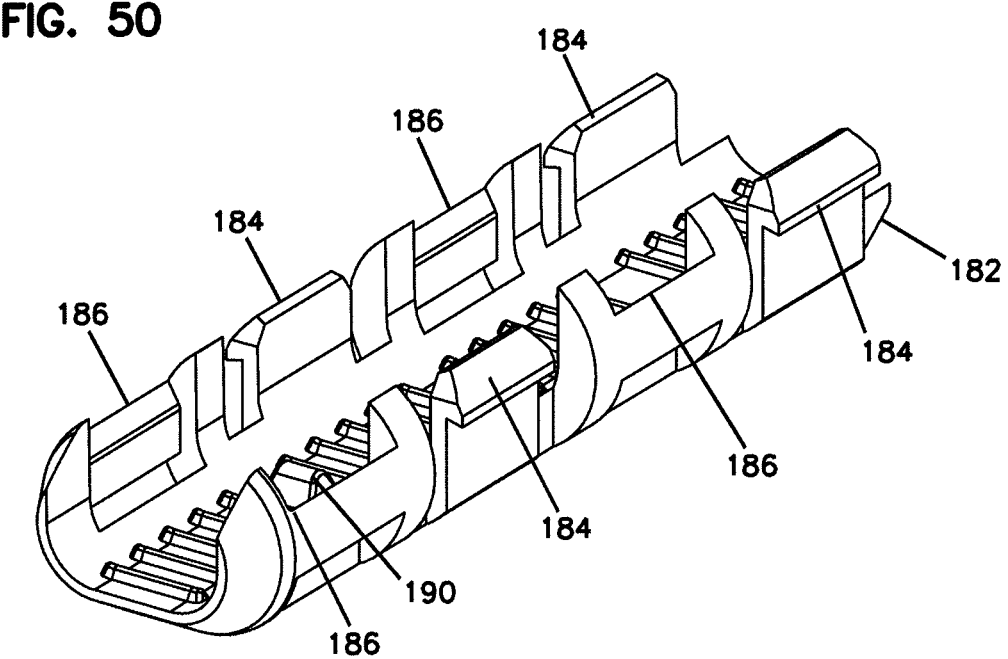
FIG. 50 is a first perspective view of another example half-shell that is part of a shell arrangement for a reinforcing a fiber-lock location of a fiber optic cable in accordance with the principles of the present disclosure.
Figure 51:
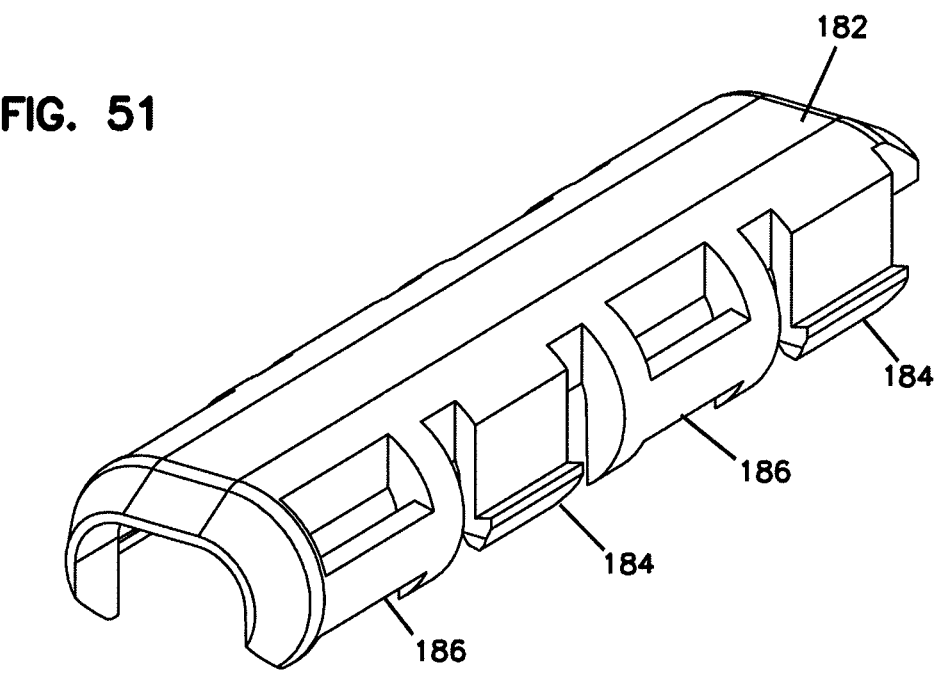
FIG. 51 is a second, opposite perspective view of the half-shell of FIG. 50.
Figure 52:
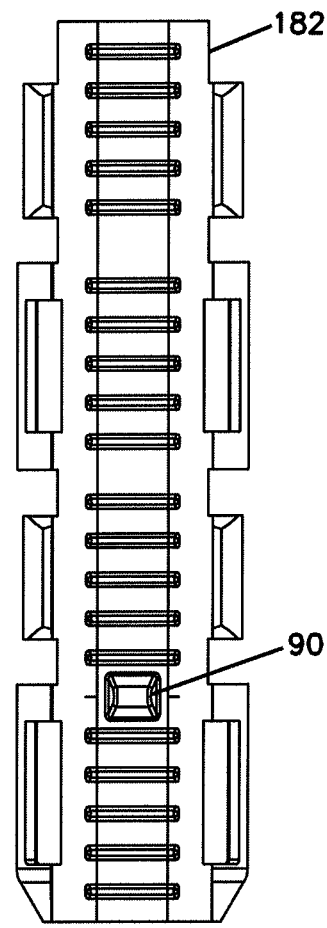
FIG. 52 is a plan view showing an inside of the half-shell of FIG. 50.
Figure 53:
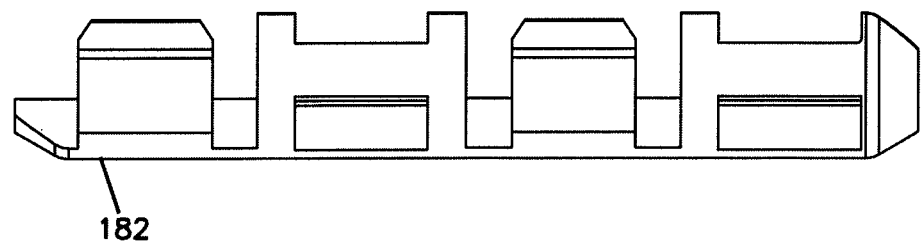
FIG. 53 is a first side view of the half-shell of FIG. 50.
Figure 54:
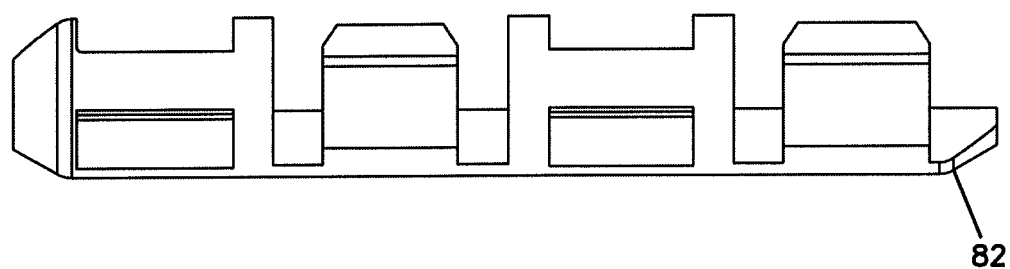
FIG. 54 is a second, opposite side view of the half-shell of FIG. 50.
Figure 55:
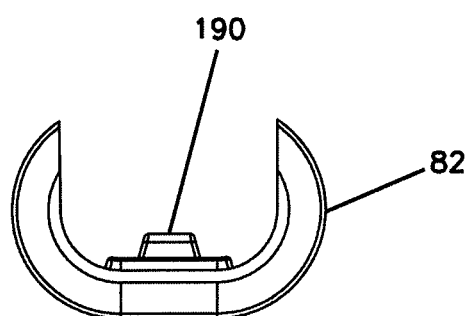
FIG. 55 is an end view of the half-shell of FIG. 50.
Figure 56:
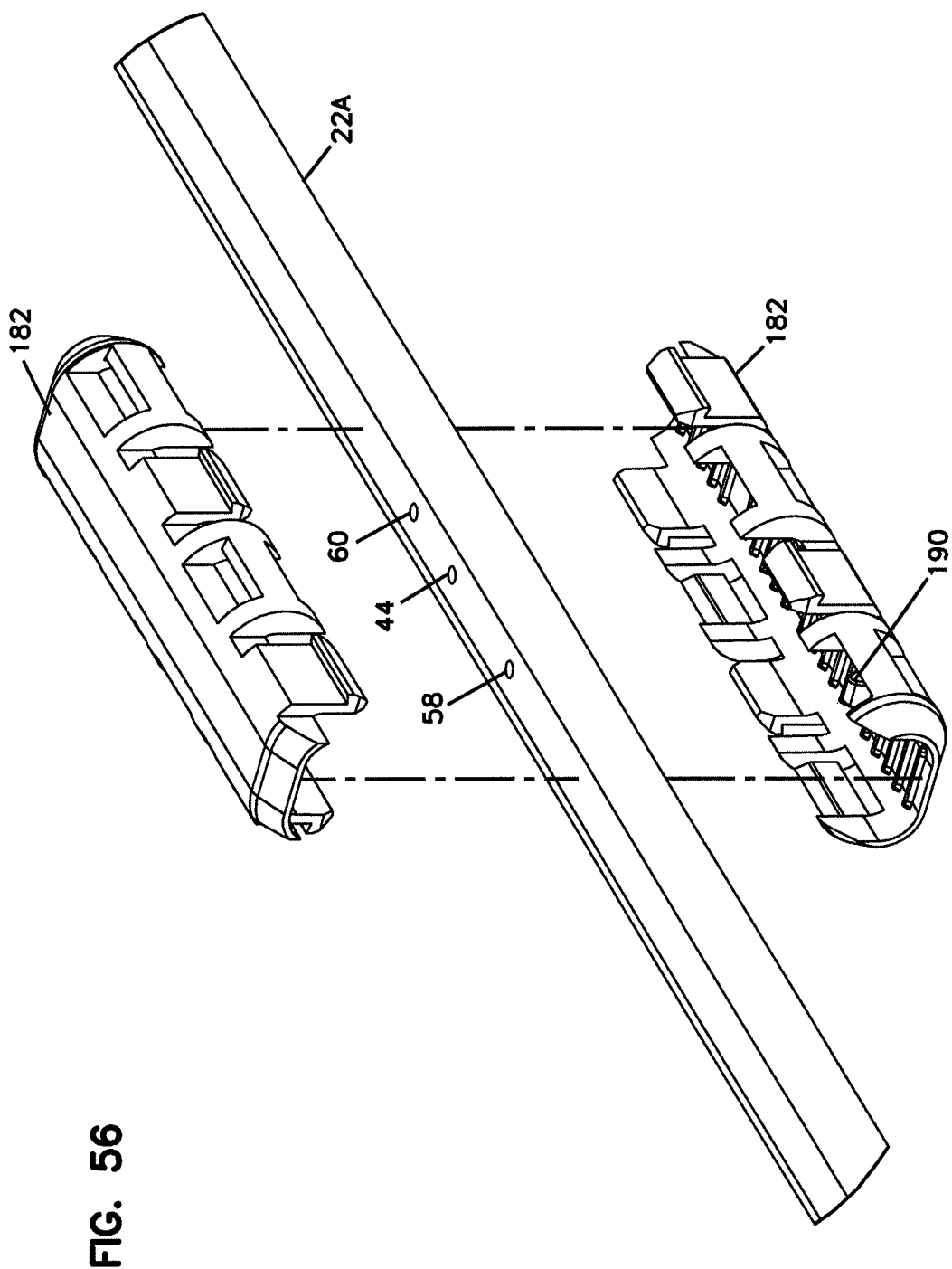
FIG. 56 is an exploded view showing two of the half-shells of FIG. 50 aligned with a fiber-lock location of a fiber optic cable.
Figure 57:
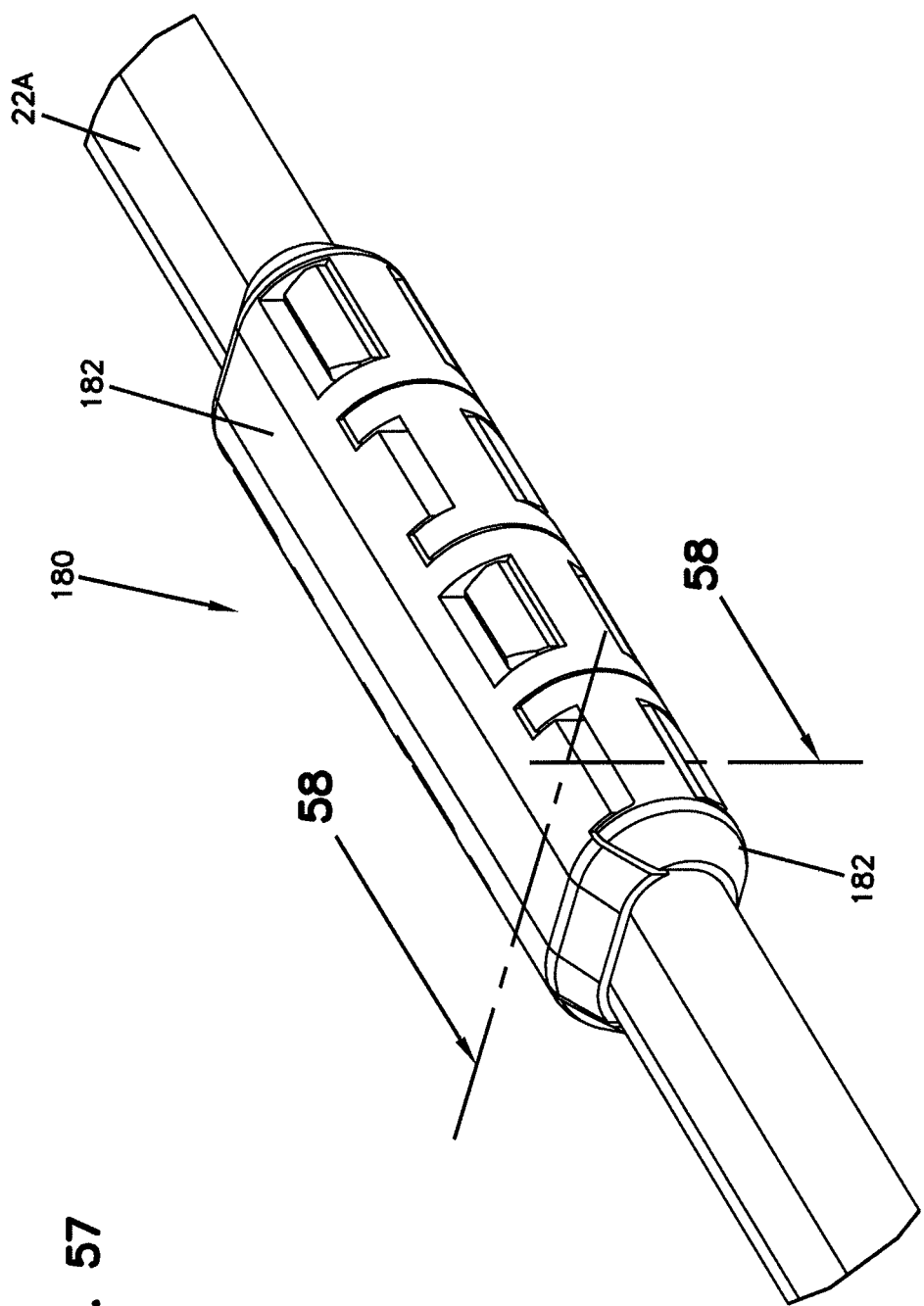
FIG. 57 shows the half-shells of FIG. 56 mounted at the fiber-lock location of the fiber optic cable.
Figure 58:
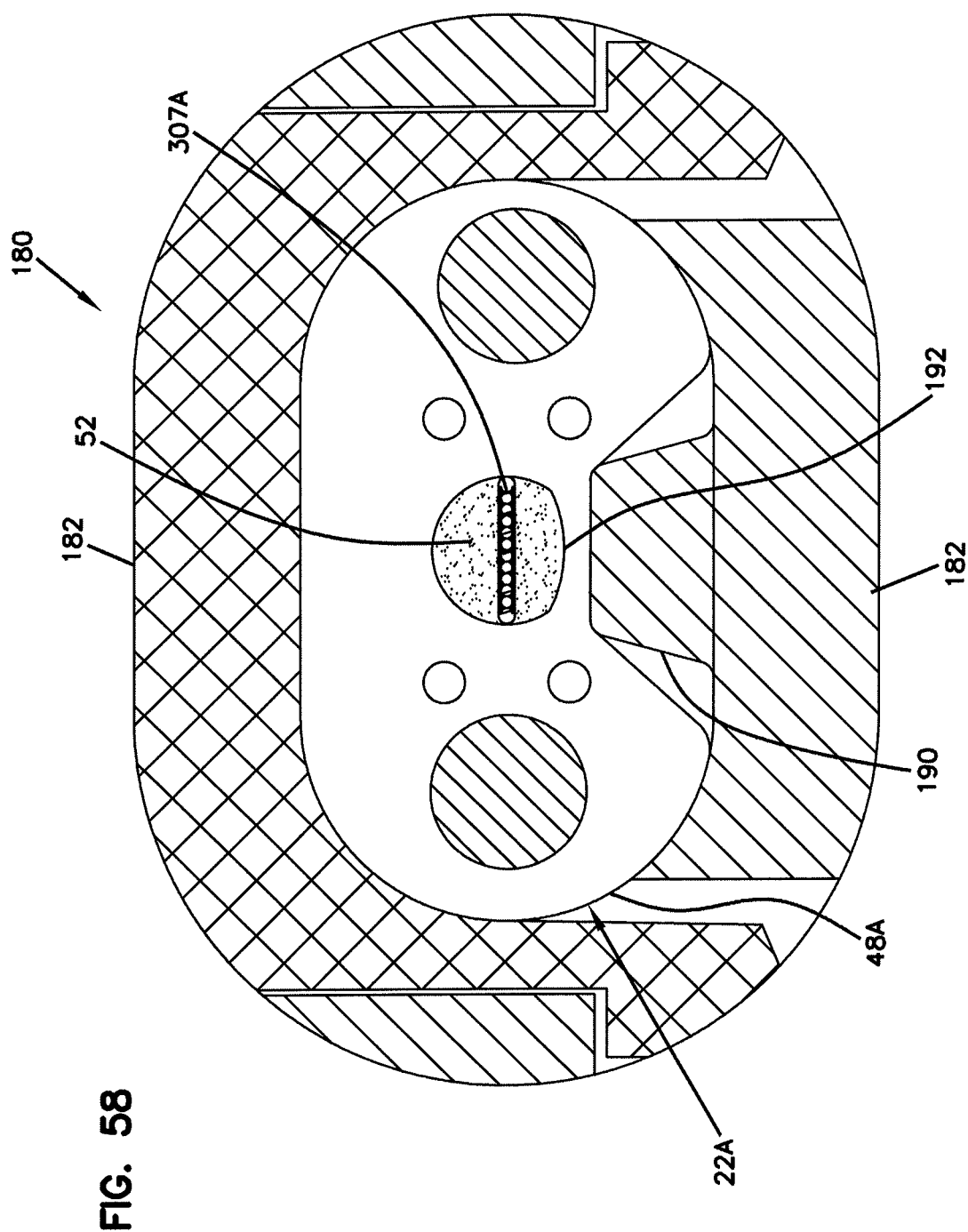
FIG. 58 is a cross-sectional view taken along section line 58-58 of FIG. 57.

FIGS. 41-49 illustrate still another shell arrangement 160 in accordance with the principles of the present disclosure. The shell arrangement 160 can be used to protect and provide rigidity to a fiber locking location that utilizes a volume of adhesive. The shell arrangement 160 includes half-shells 162 adapted to be mated in a snap-fit relationship about a fiber optic cable. The half-shells 162 each include two snap-latches 164 and two snap-receivers 166 along each opposite edge of each half-shell 162. The half-shells 162 also include internal minor ribs 168 and a single pressing projection 170. The pressing projection 170 has a projection length longer than the projection lengths of the minor ribs 168. When the half-shells 142 are snapped over a cable, the pressing projections 170 are longitudinally offset from one another and are positioned at opposite sides of the cable. FIG. 49 shows the shell arrangement 160 snapped over the fiber optic cable 22 at the fiber lock location 36. The shell arrangement 160 is preferably snapped onto the fiber optic cable 22 after the adhesive volume 50 has been injected into the conduit passage 42, but before the adhesive volume has cured. When the shell arrangement 160 is snapped over the fiber optic cable 22, the pressing projections 170 press into and deform the outer jacket 48 as shown at FIG. 49. The deformation of the jacket 48 causes the buffer tube forming the conduit 38 to deform inwardly. Specifically, the conduit 38 is deformed to include inward deformations 172 that project into the main adhesive volume 52, that mechanically interlock with the main adhesive volume 52 and that form an obstruction that resists longitudinal movement of the main adhesive volume 52 relative to the conduit 38.

FIGS. 50-58 illustrate still another shell arrangement 180 in accordance with the principles of the present disclosure. The shell arrangement 180 includes mating half-shells 182 that are secured together by a snap-fit connection. The snap-fit connection includes snap-latches 184 and snap-receptacles 186 that are alternatingly provided along each edge of each half-shell 180. Each half-shell also includes one pressing projection 190 adapted to form an inward deformation 192 (see FIG. 58) in the conduit passage of a fiber optic cable when the shell arrangement is mounted on the fiber optic cable. Preferably, the location of the pressing projection coincides with a location where adhesive is provided within the conduit passage. The pressing projection deforms the jacket of the fiber optic cable such that an inward deformation projects into the conduit passage. The inward deformation embeds into the volume of adhesive. The inward projection forms an obstruction within the conduit passage. The obstruction defines a reduced passage cross-dimension as compared to the normal cross-dimension of the conduit passage. The obstruction prevents longitudinal movement of the main adhesive volume relative to the conduit. Since the main adhesive volume is bonded to the optical fibers, the optical fibers are also prevented from moving longitudinally relative to the conduit.

As used herein, an anchor is a structure that limits or resists relative movement between two parts or things. Also, an obstruction is a structure that blocks or forms a barrier to movement of another structure. Further, a projection is a structure that projects or juts out from another structure. Example projections include rails, pillars, plugs, ridges, posts, pins, knobs, bumps, lumps, lips, fins, arms and flanges. Moreover, a pin is an elongate body having a tip that can be pointed, rounded or flat.

What is claimed is:

1. A method for fixing an optical fiber within a conduit passage defined by a conduit wall of a conduit of a fiber optic cable, the method comprising:
    making an injection port through the conduit wall from an outer side of the conduit to the conduit passage;
    making a first set of vent ports at a first side of the conduit;
    making a second set of vent ports at a second side of the conduit, wherein the first set of vent ports is longitudinally offset from the second set of vent ports;
    injecting adhesive through the injection port into the conduit passage, the injected adhesive bonding with the optical fiber within the conduit passage for providing a fiber lock, the fiber lock including an inward deformation defined by the conduit wall that protrudes into the conduit passage and engages the adhesive; and
    curing the adhesive.

2. The method of claim 1, wherein the conduit passage contains gel, and wherein gas is injected into the injection port to displace the gel before injecting the adhesive through the injection port.

3. The method of claim 1, further comprising using vent holes to control positioning of the adhesive within the conduit passage.

4. The method of claim 3, wherein the first and second vent ports each include upstream and downstream vent ports through the conduit wall to control a distance that the adhesive flows in upstream and downstream direction from the injection port.

5. The method of claim 1, further comprising inserting an anchoring projection through the conduit wall and into the adhesive within the conduit passage before curing the adhesive, wherein after the adhesive is cured the anchoring projection forms an interlock between the conduit wall and the adhesive.

6. The method of claim 1, further comprising deforming the conduit wall inwardly into the adhesive before curing the adhesive to form an interlock between the conduit wall and the adhesive.

7. The method of claim 1, wherein the conduit includes a cable jacket or a buffer tube.

8. The method of claim 1, wherein the injection port is a punched opening.

9. A method for fixing an optical fiber positioned within a conduit passage defined by a conduit wall of a conduit of a fiber optic cable, the method comprising:
    defining an adhesive injection port through the conduit wall, the adhesive injection port extending through the conduit wall from an outer side of the conduit to the conduit passage;
    injecting an adhesive volume through the adhesive injection port to bond to the optical fiber positioned within the conduit passage to provide a fiber lock, the adhesive volume being fixed to prevent longitudinal movement of the optical fiber relative to the conduit;
    defining a first vent port through the conduit wall at a first location upstream from the adhesive injection port; and
    defining a second vent port though the conduit wall at a second location downstream from the adhesive injection port;
    wherein the adhesive injection port, the first vent port, and the second vent port are a first set of ports positioned at a first side of the conduit; and
    wherein the fiber optic cable also includes a second set of ports at a second side of the conduit, the second set of ports including an adhesive injection port, a first vent port positioned upstream from the adhesive injection port, and a second vent port positioned downstream from the adhesive injection port.

10. The method of claim 9, wherein the fiber lock also includes an adhesive plug portion which is part of the adhesive volume and projects outwardly from the adhesive volume, the adhesive plug portion being positioned within the adhesive injection port, the adhesive plug portion being contiguous with the adhesive volume, wherein the adhesive plug portion forms a mechanical interlock with respect to the conduit wall which resists longitudinal movement of the optical fiber and the adhesive volume relative to the conduit wall.

11. The method of claim 9, wherein the adhesive injection port, the first vent port, and the second vent port are aligned along a reference line parallel to a central longitudinal axis of the conduit passage.

12. The method of claim 9, wherein the adhesive injection port defines a port axis that is perpendicular relative to a central longitudinal axis of the conduit passage.

13. The method of claim 9, wherein a longitudinal length of the adhesive volume is defined by and between the first and second vent ports.

14. The method of claim 9, wherein an upstream end of the adhesive volume corresponds to the first vent port and a downstream end of the adhesive volume corresponds to the second vent port.

15. The method of claim 9, wherein the adhesive injection port of the first set of ports is longitudinally offset from the adhesive injection port of the second set of ports, wherein the first vent port of the first set of ports is longitudinally offset from the first vent port of the second set of ports, and wherein the second vent port of the first set of ports is longitudinally offset from the second vent port of the second set of ports.

16. The method of claim 9, wherein the adhesive injection port projects into the conduit passage.

17. The method of claim 9, further comprising embedding an anchor in the adhesive volume that extends at least partially through the conduit wall.

18. The method of claim 17, wherein the anchor is a projection integrated with a shell that mounts about an exterior of the fiber optic cable along the adhesive volume.

19. The method of claim 9, wherein the fiber lock includes an inward deformation defined by the conduit wall that protrudes into the conduit passage and engages the adhesive volume.

20. The method of claim 19, wherein the inward deformation is embedded in the adhesive volume.

\* \* \* \* \*